(12) United States Patent
Chiba

(10) Patent No.: US 11,584,386 B2
(45) Date of Patent: Feb. 21, 2023

(54) DRIVE MODE SWITCH CONTROL DEVICE AND DRIVE MODE SWITCH CONTROL METHOD

(71) Applicant: DENSO CORPORATION, Kariya (JP)

(72) Inventor: Kunihiko Chiba, Kariya (JP)

(73) Assignee: DENSO CORPORATION, Kariya (JP)

( * ) Notice: Subject to any disclaimer, the term of this patent is extended or adjusted under 35 U.S.C. 154(b) by 711 days.

(21) Appl. No.: 16/437,132

(22) Filed: Jun. 11, 2019

(65) Prior Publication Data

US 2019/0291747 A1 Sep. 26, 2019

Related U.S. Application Data

(63) Continuation of application No. PCT/JP2017/039650, filed on Nov. 2, 2017.

(30) Foreign Application Priority Data

Dec. 22, 2016 (JP) .............................. JP2016-249621

(51) Int. Cl.
*B60W 50/12* (2012.01)
*B60W 30/182* (2020.01)
(Continued)

(52) U.S. Cl.
CPC ............ *B60W 50/12* (2013.01); *B60W 30/00* (2013.01); *B60W 30/182* (2013.01);
(Continued)

(58) Field of Classification Search
CPC .... B60W 50/12; B60W 30/00; B60W 30/182; B60W 40/08; B60W 50/08;
(Continued)

(56) References Cited

U.S. PATENT DOCUMENTS 9,651,947 B2 * 5/2017 Kim ...................... G05D 1/0088
9,714,036 B2 * 7/2017 Yamaoka ............... B60W 50/10
(Continued)

FOREIGN PATENT DOCUMENTS

| JP | 2016133984 A | 7/2016 |
| JP | 2016151815 A | 8/2016 |
| JP | 2016203718 A | 12/2016 |

*Primary Examiner* — Ig T An
(74) *Attorney, Agent, or Firm* — Harness, Dickey & Pierce, P.L.C.

(57) ABSTRACT

A drive mode switch control device controls switching of driving between a driver and an autonomous driving function. The drive mode switch control device includes an operation information acquisition unit, a drive state switch unit, an attitude determination unit, and an approved target setting unit. The operation information acquisition unit acquires an operation information item associated with the driving operation input to at least one of a plurality of operation targets. The drive state switch unit executes an override that switches from an autonomous driving state to another driving state. The attitude determination unit acquires a plurality of detection information items related to driving attitudes of the driver, and determine whether each of the plurality of detection information items is appropriate for the driving operation. The approved target setting unit sets an approved operation target or a disapproved operation target to each of the plurality of operation targets.

11 Claims, 11 Drawing Sheets

| OVERRIDE OPERATION APPROVAL DETERMINATION TABLE | | DRIVING ATTITUDE STATE | | | | | | | |
|---|---|---|---|---|---|---|---|---|---|
| | | A | B | C | D | E | F | G | H |
| VISUAL LINE DIRECTION, FACE DIRECTION | | O | × | O | × | O | × | O | × |
| STEERING GRIP | | O | O | × | × | O | O | × | × |
| SEATING STATE | | O | O | O | O | × | × | × | × |
| OVERRIDE OPERATION APPROVAL | ACCELERATION | APPROVAL | DISAPPROVAL | APPROVAL | DISAPPROVAL | DISAPPROVAL | | | |
| | STEERING | APPROVAL | APPROVAL | DISAPPROVAL | DISAPPROVAL | DISAPPROVAL | | | |
| | BRAKE | APPROVAL | APPROVAL | APPROVAL | APPROVAL | DISAPPROVAL | | | |

O : STATE APPROPRIATE FOR DRIVING OPERATION
× : STATE INAPPROPRIATE FOR DRIVING OPERATION

(51) Int. Cl.
- *B60W 40/08* (2012.01)
- *B62D 1/28* (2006.01)
- *G05D 1/00* (2006.01)
- *G08G 1/16* (2006.01)
- *B60W 30/00* (2006.01)
- *B60W 50/08* (2020.01)
- *B60W 50/00* (2006.01)
- *G08G 1/00* (2006.01)

(52) U.S. Cl.
CPC ............ *B60W 40/08* (2013.01); *B60W 50/08* (2013.01); *B62D 1/286* (2013.01); *G05D 1/0061* (2013.01); *G05D 1/0088* (2013.01); *G08G 1/00* (2013.01); *G08G 1/16* (2013.01); *B60W 2050/007* (2013.01); *B60W 2540/10* (2013.01); *B60W 2540/12* (2013.01); *B60W 2540/18* (2013.01)

(58) Field of Classification Search
CPC ........ B60W 2050/007; B60W 2540/12; B62D 1/286; G05D 1/0061; G05D 1/0088; G08G 1/16

See application file for complete search history.

(56) References Cited

U.S. PATENT DOCUMENTS

| | | | | |
|---|---|---|---|---|
| 9,845,096 | B2 * | 12/2017 | Urano | B60W 50/10 |
| 9,855,956 | B2 * | 1/2018 | Omi | G05D 1/0088 |
| 9,864,373 | B2 * | 1/2018 | Otaki | B60W 50/14 |
| 9,878,723 | B2 * | 1/2018 | Kim | B60W 50/10 |
| 9,919,724 | B2 * | 3/2018 | Lubischer | B62D 1/181 |
| 9,919,741 | B2 * | 3/2018 | Kim | B62D 15/025 |
| 9,950,740 | B2 * | 4/2018 | Sato | B60W 30/12 |
| 10,029,676 | B2 * | 7/2018 | Kaufmann | B60W 30/02 |
| 10,029,724 | B2 * | 7/2018 | Lubischer | B62D 1/181 |
| 10,054,942 | B2 * | 8/2018 | Ichikawa | B60W 50/082 |
| 10,059,315 | B2 * | 8/2018 | Brannstrom | B60T 7/12 |
| 10,067,505 | B2 * | 9/2018 | Ichikawa | B60W 60/0053 |
| 10,108,190 | B2 * | 10/2018 | Tomatsu | G05D 1/0088 |
| 10,120,380 | B2 * | 11/2018 | Otaki | B60W 60/0059 |
| 10,146,222 | B2 * | 12/2018 | Chan | B60W 50/087 |
| 10,210,760 | B2 * | 2/2019 | Hoffman, Jr. | G08G 1/168 |
| 10,222,796 | B2 * | 3/2019 | Ichikawa | G05D 1/0061 |
| 10,259,471 | B2 * | 4/2019 | Sato | B60W 50/082 |
| 10,308,254 | B2 * | 6/2019 | Hirano | B60W 50/10 |
| 10,338,583 | B2 * | 7/2019 | Kuwahara | B62D 15/025 |
| 10,338,584 | B2 * | 7/2019 | Otaki | G05D 1/0088 |
| 10,351,147 | B2 * | 7/2019 | Salter | G05D 1/0061 |
| 10,353,391 | B2 * | 7/2019 | Koike | G05D 1/021 |
| 10,363,958 | B2 * | 7/2019 | Otto | B62D 15/025 |
| 10,372,125 | B2 * | 8/2019 | Watanabe | G08B 21/06 |
| 10,449,970 | B2 * | 10/2019 | Urano | B60W 30/09 |
| 10,481,602 | B2 * | 11/2019 | Chandy | B60R 11/04 |
| 10,493,997 | B2 * | 12/2019 | Kim | B60W 50/10 |
| 10,496,102 | B2 * | 12/2019 | Riefe | G05D 1/0246 |
| 10,509,400 | B2 * | 12/2019 | Sato | G05D 1/0061 |
| 10,525,983 | B2 * | 1/2020 | Ichikawa | B60W 30/18163 |
| 10,528,045 | B2 * | 1/2020 | Kim | G05D 1/0061 |
| 10,583,833 | B2 * | 3/2020 | Oniwa | B60W 30/18027 |
| 10,591,913 | B2 * | 3/2020 | Knorr | B60R 16/023 |
| 10,640,123 | B2 * | 5/2020 | Morita | G06K 9/00845 |
| 10,649,452 | B2 * | 5/2020 | Ichikawa | B60W 40/00 |
| 10,671,071 | B2 * | 6/2020 | Jang | B60W 40/08 |
| 10,710,632 | B2 * | 7/2020 | Sato | B62D 15/025 |
| 10,717,437 | B2 * | 7/2020 | Uchida | B60W 40/09 |
| 10,744,967 | B2 * | 8/2020 | Lee | B60H 1/00357 |
| 10,747,220 | B2 * | 8/2020 | Uchida | G05D 1/0088 |
| 10,780,915 | B2 * | 9/2020 | Rakouth | B62D 15/025 |
| 10,787,199 | B2 * | 9/2020 | Kim | G05D 1/0088 |
| 10,843,707 | B2 * | 11/2020 | Gruchalski | G01C 21/3697 |
| 10,849,544 | B2 * | 12/2020 | Yamataka | A61B 5/1116 |
| 10,895,875 | B2 * | 1/2021 | Hashimoto | B60K 28/02 |
| 10,921,804 | B2 * | 2/2021 | Okimoto | G05D 1/0061 |
| 10,921,805 | B2 * | 2/2021 | Lin | H04L 67/125 |
| 10,994,747 | B2 * | 5/2021 | Augst | B60W 30/18163 |
| 11,027,608 | B2 * | 6/2021 | Kojima | B60W 60/0053 |
| 11,027,737 | B2 * | 6/2021 | Seto | G08G 1/162 |
| 11,046,332 | B2 * | 6/2021 | Akaba | G05D 1/0038 |
| 2015/0120124 | A1 * | 4/2015 | Bartels | B60W 50/10 701/23 |
| 2016/0137059 | A1 * | 5/2016 | Mader | B60W 40/08 340/575 |
| 2016/0207536 | A1 * | 7/2016 | Yamaoka | B60W 50/10 |
| 2016/0207537 | A1 * | 7/2016 | Urano | B60W 50/16 |
| 2016/0207538 | A1 * | 7/2016 | Urano | G05D 1/0061 |
| 2016/0304124 | A1 * | 10/2016 | Fujiyoshi | G05D 1/0061 |
| 2016/0355190 | A1 * | 12/2016 | Omi | B60W 30/12 |
| 2017/0021282 | A1 * | 1/2017 | Comploi | B60W 50/10 |
| 2017/0028876 | A1 * | 2/2017 | Yamada | B60N 2/06 |
| 2017/0028987 | A1 * | 2/2017 | Yamada | B60W 30/182 |
| 2017/0248954 | A1 * | 8/2017 | Tomatsu | B60W 40/08 |
| 2017/0261981 | A1 * | 9/2017 | Ichikawa | B60W 50/14 |
| 2017/0313314 | A1 * | 11/2017 | Sen | B60W 30/16 |
| 2017/0315550 | A1 * | 11/2017 | Ichikawa | B60W 60/0051 |
| 2018/0074497 | A1 * | 3/2018 | Tsuji | G01C 21/3484 |
| 2018/0088572 | A1 * | 3/2018 | Uchida | B60W 10/18 |
| 2018/0093675 | A1 * | 4/2018 | Holub | B60W 50/14 |
| 2018/0113454 | A1 * | 4/2018 | Emura | B60W 50/14 |
| 2019/0143989 | A1 * | 5/2019 | Oba | A61B 3/113 701/70 |
| 2019/0291744 | A1 * | 9/2019 | Mimura | B60W 10/04 |

* cited by examiner

FIG. 4

| OVERRIDE OPERATION APPROVAL DETERMINATION TABLE | | A | B | C | D | E | F | G | H |
|---|---|---|---|---|---|---|---|---|---|
| | VISUAL LINE DIRECTION, FACE DIRECTION | ○ | × | ○ | × | ○ | × | ○ | × |
| | STEERING GRIP | ○ | ○ | × | × | ○ | ○ | × | × |
| | SEATING STATE | ○ | ○ | ○ | ○ | × | × | × | × |
| OVERRIDE OPERATION APPROVAL | ACCELERATION | APPROVAL | DISAPPROVAL | APPROVAL | DISAPPROVAL | | | | |
| | STEERING | APPROVAL | APPROVAL | DISAPPROVAL | DISAPPROVAL | | | | |
| | BRAKE | APPROVAL | APPROVAL | APPROVAL | APPROVAL | | | | |

Driving attitude state (columns A–H)

○ : STATE APPROPRIATE FOR DRIVING OPERATION
× : STATE INAPPROPRIATE FOR DRIVING OPERATION

DRIVE MODE SWITCH CONTROL DEVICE AND DRIVE MODE SWITCH CONTROL METHOD

CROSS REFERENCE TO RELATED APPLICATIONS

The present application is a continuation application of International Patent Application No. PCT/JP2017/039650 filed on Nov. 2, 2017, which designated the United States and claims the benefit of priority from Japanese Patent Application No. 2016-249621 filed on Dec. 22, 2016. The entire disclosures of all of the above applications are incorporated herein by reference.

TECHNICAL FIELD

The disclosure relates to a drive mode switch control device and a drive mode switch control method each of which controls a drive mode switch between a driver and an autonomous driving function.

BACKGROUND

A driving support device attached to a vehicle performs autonomous driving. When detecting an override by a driver to an operation target such as an accelerator pedal, a brake pedal, a steering wheel, or the like, the driving support device switches from the autonomous driving to manual driving.

SUMMARY

A drive mode switch control device for a vehicle may control switching of driving between a driver and an autonomous driving function. The drive mode switch control device may acquire an operation information item associated with the driving operation input to at least one of a plurality of operation targets. The drive mode switch control device may execute an override that switches from an autonomous driving state to another driving state.

BRIEF DESCRIPTION OF DRAWINGS

The above and other objects, features and advantages of the present disclosure will become more apparent from the following detailed description when taken in conjunction with the accompanying drawings. In the drawings:

FIG. 4 is a diagram showing a table which defines a relationship between a plurality of types of detection information items and operation targets set as an approved operation target based on whether a driving attitude indicated by each of the detection information items is appropriate;

DETAILED DESCRIPTION

Figure 1:
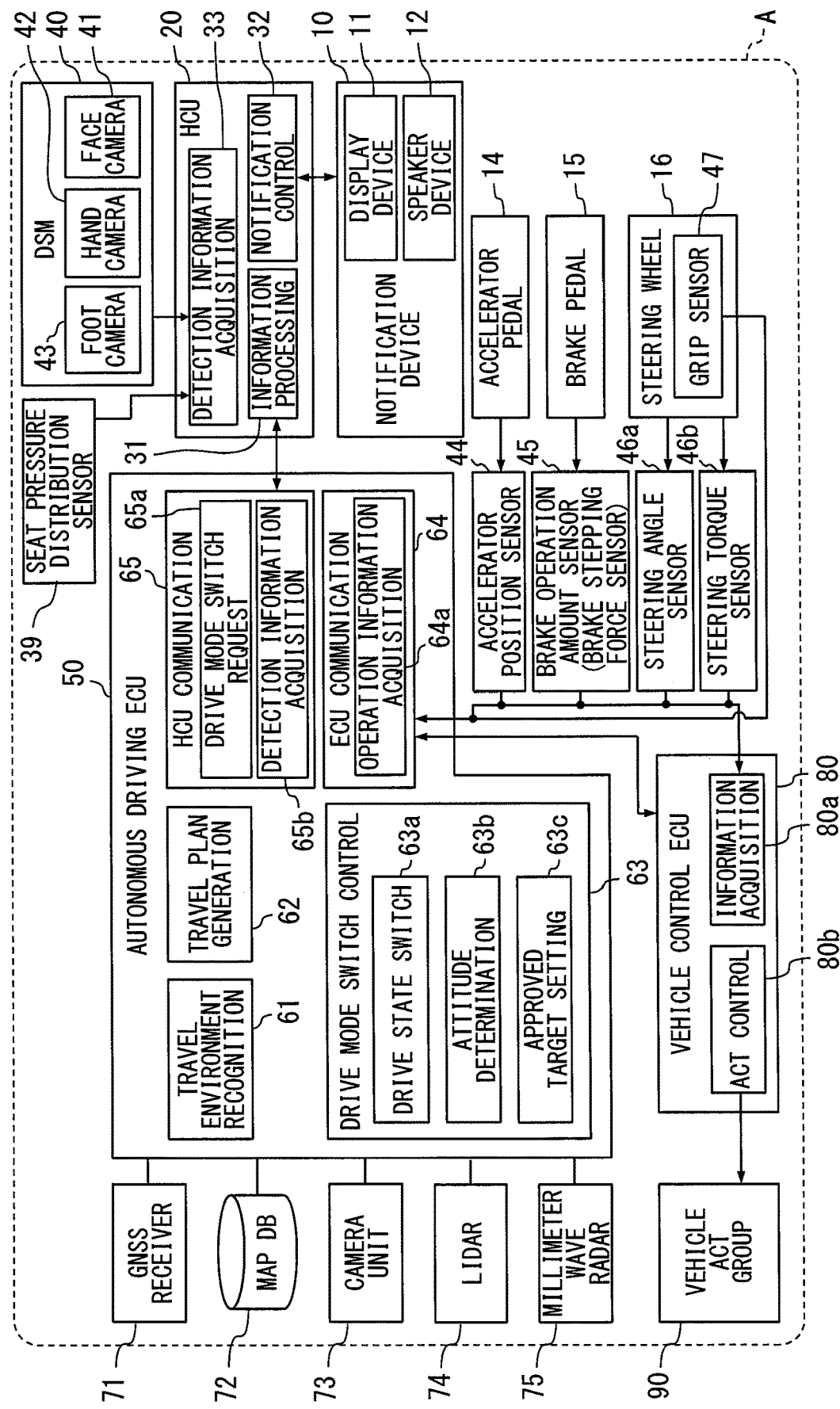
FIG. 1 is a block diagram showing an overview of a configuration related to an autonomous driving attached to a vehicle.

For example, a driving support device attached to a vehicle performs autonomous driving. When detecting an override by the driver to an operation target such as an accelerator pedal, a brake pedal, a steering wheel, or the like, the driving support device switches from the autonomous driving to manual driving. In addition, the driving support device determines whether the driver is in a careless state, in which the driver lacks concentration, based on information such as a visual line direction or a face direction of the driver. When the driver is in the careless state, the driving support device does not switch from the autonomous driving to the manual driving. With this configuration, the occurrence of the override due to a careless input to the operation target is suppressed.

When determining that the information such as the visual line direction or the face direction is not appropriate for the driving operation, the driving support device deactivates the override to all the operation targets. Even when the visual line direction or the face direction may not be appropriate, it is estimated that the brake operation can be appropriately performed. As described above, a situation may occur in which the operation target estimated that the driver is capable of appropriately performing the driving operation among the plurality of operation targets cannot be approved.

An example embodiment of the present disclosure provides a drive mode switch control device for a vehicle. The vehicle includes an autonomous driving function replacing a driving operation with a driver. The drive mode switch control device controls switching of driving between the driver and an autonomous driving function. The drive mode switch control device includes the operation information acquisition unit, a drive state switch unit, an attitude determination unit, and an approved target setting unit. The operation information acquisition unit acquires an operation information item associated with the driving operation input to at least one of a plurality of operation targets. The plurality of operation targets includes at least an accelerator part, a brake part, and a steering part. The drive state switch unit executes an override that switches from an autonomous driving state to another driving state in response to an input of the driving operation to at least one of the plurality of operation targets while the vehicle is in the autonomous driving state. In the autonomous driving state, the autonomous driving function controls a travel of the vehicle. In another driving state, the driving operation of the driver reflects on a behavior of the vehicle. The attitude determination unit acquires a plurality of detection information items related to driving attitudes of the driver, and determines whether each of the plurality of detection information items is appropriate for the driving operation. The approved target setting unit sets an approved operation target, for which the override is approved, or a disapproved operation target, for which the override is not approved, to each of the accelerator part, the brake part, and the steering part included in the plurality of operation targets based on whether each of the plurality of detection information items is appropriate for the driving operation.

Another example embodiment of the present disclosure provides a drive mode switch control method for a vehicle. The vehicle includes an autonomous driving function replacing a driving operation with a driver. The drive mode switch control device controls switching of driving between the driver and an autonomous driving function. The drive mode switch control method is executed by at least one processing unit. The drive mode switch control method includes: acquiring a plurality of detection information items related to driving attitudes of the driver while the vehicle is in an autonomous driving state, in which the autonomous driving function controls a travel of the vehicle; determining whether each of the plurality of detection information items is appropriate for the driving operation; setting an approved operation target, for which an override is approved, or a disapproved operation target, for which the override is not approved, to at least an accelerator part, a brake part, and a steering part included in a plurality of operation targets based on whether each of the plurality of detection information items is appropriate for the driving operation; acquiring an operation information item associated with the driving operation input to at least one of the plurality of operation targets; switching from the autonomous driving state to another driving state, in which the driving operation of the driver reflecting on a behavior of the vehicle, by approving the driving operation to the approved operation target as the override; and disapproving the driving operation to the disapproved operation target as the override.

In an example embodiment of the present disclosure, it is determined whether the plurality of detection information items related to the driving attitude of the driver indicate the state appropriate for the driving operation. Based on the determination result, the approved operation target for which the override is accepted and the disapproved operation target for which the override is not approved are individually set. With this configuration, when driving operation to any one of the operation targets is not appropriately performed in the driving attitude, the operation target can be set as the disapproved operation target. Thus, even when an unintended operation is input to the disapproved operation target due to an inappropriate driving attitude, the override is not executed. On the other hand, the operation target which is estimated that the driver appropriately performs the driving operation can be set as the approved operation target. As a result, even when the driving attitude is partially inappropriate, the driver can perform the override by the input of the driving operation to the approved operation target. Thus, the configuration can suppress the occurrence of the unintended override, and cause the driver to appropriately perform the drive mode switch.

Hereinafter, a plurality of embodiments of the present disclosure will be described with reference to the drawings. The same reference numerals are assigned to the corresponding elements in each embodiment, and thus, duplicate descriptions may be omitted. When configurations are described only partly in the respective embodiments, the configurations of the embodiments previously described may be applied to the rest of the configurations. Further, not only the combinations of the configurations explicitly shown in the description of the respective embodiments, but also the configurations of the plurality of embodiments can be partially combined even when they are not explicitly shown as long as there is no difficulty in the combination in particular. Unspecified combinations of the configurations described in the plurality of embodiments and the modification examples are also disclosed in the following description.

First Embodiment

Figure 2:
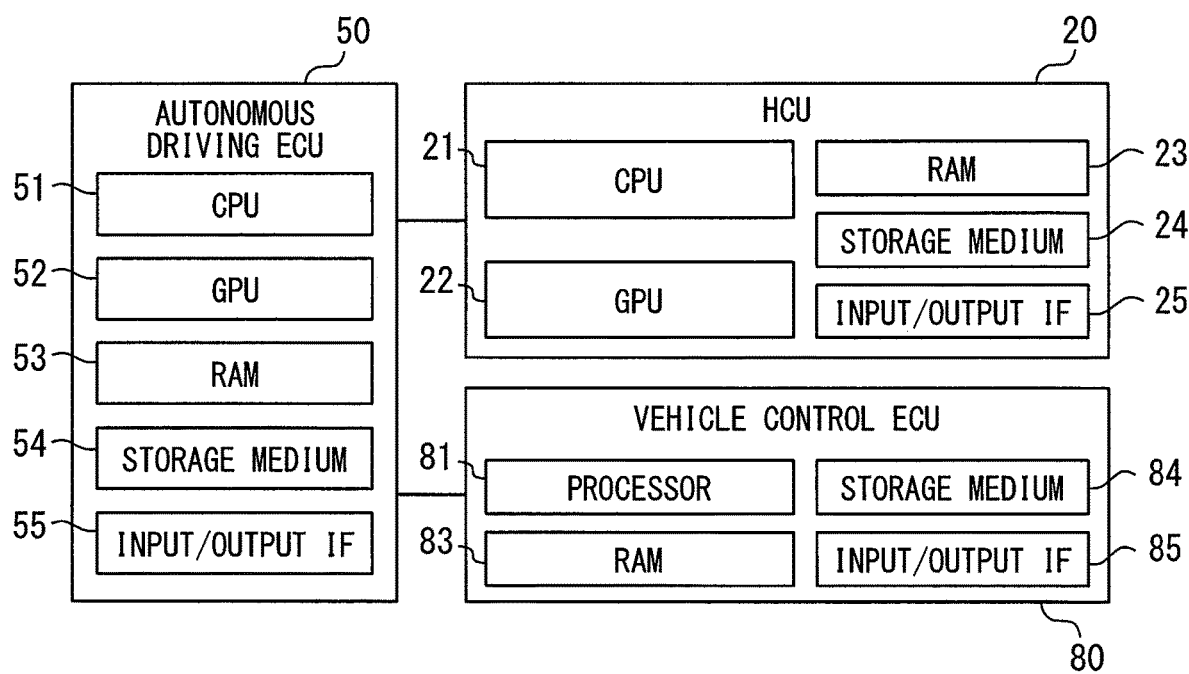
FIG. 2 is a diagram showing an example of a specific configuration of an autonomous driving ECU, an HCU, and a vehicle control ECU.

Functions of a drive mode switch control device according to a first embodiment of the present disclosure is realized by an autonomous driving ECU (Electronic Control Unit) 50 shown in FIG. 1 and FIG. 2. The autonomous driving ECU 50 is mounted on a vehicle A together with electronic control units such as a HCU (HMI (Human Machine Interface) Control Unit) 20, a vehicle control ECU 80, and the like. The autonomous driving ECU 50, the HCU 20, and the vehicle control ECU 80 are directly or indirectly electrically connected to each other, and can communicate with each other. The vehicle A has an autonomous driving function by the operation of the autonomous driving ECU 50 and the operation of the vehicle control ECU 80.

The HCU 20 integrally controls acquisition of input information to an operation system such as a steering switch and presentation of information to the driver. The HCU 20 mainly includes a computer having a main processor (CPU) 21, a graphic processor (GPU) 22, a RAM 23, a storage medium 24, and an input/output interface (input/output IF) 25. The HCU 20 is electrically connected to a notification device 10, a seat pressure distribution sensor 39, a driver status monitor (driver status monitor, DSM) 40, and the like.

The notification device 10 notifies various kinds of information related to the vehicle A to the occupant of the vehicle A including the driver based on a notification control signal output by the HCU 20. The notification device 10 may be preliminary mounted on the vehicle A, or may be temporarily mounted on the vehicle A by being brought into the vehicle compartment by the occupant of the vehicle A. The notification device 10 includes, for example, a display device 11 that notifies the information by display, a speaker device 12 that notifies the information by a notification sound, a message voice, or the like.

The seat pressure distribution sensor 39 is constituted by a pressure sensitive film sensor or the like. The seat pressure distribution sensor 39 is embedded in the seat surface of the driver's seat. The seat pressure distribution sensor 39 may have a large number of pressure sensitive points arranged on a two-dimensional matrix and detect the distribution of the pressure acting on the seat surface of the driver's seat. The detected value at each pressure sensitive point is associated with the coordinates of the pressure sensitive point or a management number. With this configuration, the seat pressure distribution sensor 39 generates a group of data indicating the pressure distribution acting on the seat surface. The seat pressure distribution sensor 39 sequentially outputs the pressure distribution data as a detection result to the HCU 20. The pressure distribution data is one of a plurality of detection information item related to the driver's driving attitude.

A seat surface sensor, which detects the seating of the driver on the seat surface, may replace the seat pressure distribution sensor 39. The output of the seat surface sensor may be turned on by the seating of the driver and turned off by the non-seating of the driver. In this configuration, the information of the on state or the off state of the output of the seat sensor is included in one of the detection information item.

The DSM 40 is a device that monitors the driver's state. The DSM 40 includes a face camera 41, a hand camera 42, a foot camera 43, and a control unit that individually controls the cameras 41 to 43. Each of the cameras 41 to 43 may be combined with a light source unit that emits near-infrared light for capturing a picture.

The face camera 41 is installed on the upper surface of the steering column cover, the upper surface of the instrument panel, or the like. The imaging range of the face camera 41 is set to include at least the face of the driver seated in the driver's seat. The face camera 41 captures the image capable of detecting at least one of the visual line direction and the face direction of the driver, for example, at a frame rate of 30 frames per second, and sequentially outputs the captured data to the HCU 20.

The hand camera 42 is installed in the vehicle compartment of the vehicle A so that the periphery of the steering wheel 16 of the vehicle A is included in an imaging range. The hand camera 42 captures an image capable of detecting the driver's hand gripping or trying to grip the spoke of the steering wheel 16, for example, at a frame rate of 30 frames per second, and sequentially outputs the captured data to the HCU 20.

The foot camera 43 may be installed on the lower surface of the instrument panel so that the periphery of the accelerator pedal 14 and the brake pedal 15 of the vehicle A is included in an imaging range. The foot camera 43 captures an image capable of detecting the driver's foot stepping on the accelerator pedal 14 and the brake pedal 15, for example, at a frame rate of 30 frames per second, and sequentially outputs the captured data to the HCU 20.

The HCU 20 has an information processing unit 31, a notification control unit 32, and a detection information acquisition unit 33 as functional blocks by causing the processors 21 and 22 to execute the notification control program, the attitude detection program, and the like stored in the storage medium 24.

The information processing unit 31 acquires various kinds of information from the autonomous driving ECU 50 and the vehicle control ECU 80, and outputs various kinds of information to the autonomous driving ECU 50 and the vehicle control ECU 80. The information processing unit 31 acquires, for example, switch request information for requesting the drive mode switch from the autonomous driving function to the driver. In addition, the information processing unit 31 sequentially outputs a detection information item related to the driving attitude acquired by the detection information acquisition unit 33 to the autonomous driving ECU 50.

The notification control unit 32 generates the notification control signal to be output to the display device 11 and the speaker device 12 based on the information acquired by the information processing unit 31. The notification control unit 32 controls the information presentation by display and sound by outputting the notification control signal to the display device 11 and the speaker device 12. The notification control unit 32 notifies the driver of taking over the driving operation from the autonomous driving function using the display device 11 and the speaker device 12 when the switch request information is acquired by the information processing unit 31.

The detection information acquisition unit 33 acquires the pressure distribution data of the seat surface from the seat pressure distribution sensor 39, and acquires the image data from the cameras 41 to 43 of the DSM 40. The detection information acquisition unit 33 generates the detection information item related to the driving attitude of the driver by image analysis of the imaging data of each of the cameras 41 to 43. Specifically, the detection information acquisition unit 33 calculates the visual line direction and the face direction of the driver by analyzing the imaging data of the face camera 41. The detection information acquisition unit 33 detects the gripping state for the steering wheel 16 of the driver by analyzing the imaging data of the hand camera 42. The detection information acquisition unit 33 detects whether the driver's foot is at a position where the accelerator pedal 14 or the brake pedal 15 can be appropriately stepped by analyzing the imaging data of the foot camera 43. The detection information acquisition unit 33 sequentially outputs a plurality of detection information items based on the detection results of the seat pressure distribution sensor 39 and the DSM 40 to the autonomous driving ECU 50 through the information processing unit 31.

The detection information acquisition unit 33 is also capable of extracting grip possibility that the driver tries to grip the steering wheel 16 as a detection information item indicating the gripping state. Specifically, when there is a driver's hand in the vicinity of the steering wheel 16 and the drive is capable of immediately gripping the steering wheel 16, the detection information acquisition unit 33 generates the detection information item indicating that the driver appropriately grips the steering wheel 16. On the other hand, when there is a driver's hand in the vicinity of the steering wheel 16 but the driver holds a portable terminal or the like in the hand, the detection information acquisition unit 33 generates the detection information item indicating that the driver does not appropriately grip the steering wheel 16.

The image analysis of imaging data may be executed by the analysis processing unit included in the DSM40 instead of the HCU20. In this configuration, the detection information acquisition unit 33 is capable of directly acquiring, from the DSM 40, the detection information items such as the visual line direction and the face direction of the driver, the gripping state, and the foot state.

The vehicle control ECU 80 is directly or indirectly electrically connected to a vehicle actuator group 90 mounted on the vehicle A. In addition, the vehicle control ECU 80 is electrically connected directly or indirectly to a sensor group that detects the driving operation performed by the driver. The vehicle actuator group 90 includes, for example, a throttle actuator of an electronic control throttle, an injector, a brake actuator, drive and regenerative motor generators, a steering actuator, or the like.

The sensor group includes an accelerator position sensor 44, a brake operation amount sensor 45, a steering angle sensor 46a, a steering torque sensor 46b, a grip sensor 47, and the like. Each of the sensors 44 to 47 detects the driving operation input to the accelerator pedal 14, the brake pedal 15, or the steering wheel 16, which is set as an operation target for the driving operation.

The accelerator position sensor 44 detects the stroke amount of the accelerator pedal 14. The brake operation amount sensor 45 is constituted by a brake stepping force sensor that detects the stepping force input to the brake pedal 15. The steering angle sensor 46a detects the absolute value of the rotational angle, which is the rotational angle of the steering wheel 16 (hereinafter referred to as "steering angle") from the angular phase (0°) when the vehicle is traveling straight. The steering torque sensor 46b detects a steering torque input to the steering wheel 16. Each of the sensors 44 to 46b sequentially outputs an operation information item for detecting the driving operation to the autonomous driving ECU 50 and the vehicle control ECU 80.

The grip sensor 47 may be embedded in the spoke of the steering wheel 16. The grip sensor 47 measures the pressure or capacitance at the spoke. The grip sensor 47 detects the driver's grip on the steering wheel 16 based on the change in the pressure or capacitance. The grip sensor 47 sequentially outputs the detection result of the gripping state of the steering wheel 16 to the autonomous driving ECU 50 as the detection information item related to the driving attitude of the driver. The detection result indicating whether the steering torque detected by the steering torque sensor 46b exceeds a predetermined threshold value may be provided to the autonomous driving ECU 50 as one of the detection information item indicating the gripping state.

The vehicle control ECU 80 mainly includes a computer having a processor 81, a RAM 83, a storage medium 84, an input/output interface 85, and the like. The processor 81 executes the vehicle control program stored in the storage medium 84 so that the vehicle control ECU 80 constructs a drive information acquisition unit 80a and an actuator control unit (ACT control unit) 80b as functional blocks.

The drive information acquisition unit 80a is capable of acquiring, as information used for attitude control of the vehicle A, a drive state information item (described later) in addition to the vehicle control information item output from the autonomous driving ECU 50 and the operation information item output from the sensor group. The drive state information item indicates the operation state of the autonomous driving. The actuator control unit 80b generates the control signal output from the vehicle control ECU 80 to the vehicle actuator group 90 based on at least one of the vehicle control information item and the operation information item acquired by the drive information acquisition unit 80a.

The autonomous driving ECU 50 is electrically connected directly or indirectly to a GNSS receiver 71, a map database 72, a camera unit 73, a lidar 74, a millimeter wave radar 75 and the like. The autonomous driving ECU 50 acquires information related to the travel environment around the subject vehicle necessary for the autonomous driving from these devices (71 to 75).

The GNSS (Global Navigation Satellite System) receiver 71 receives positioning signals from a plurality of artificial satellites. The GNSS receiver 71 measures the present position of the vehicle A based on the received positioning signals. The GNSS receiver 71 sequentially outputs the measured position information of the vehicle A to the autonomous driving ECU 50.

The map database 72 is a storage medium storing a large amount of map data. The map data includes structural information such as the curvature of each road, the gradient, and the length of each section, and non-temporary traffic regulation information such as speed limit and one-way traffic. The map database 72 causes the autonomous driving ECU 50 to acquire the map data around the present position of the vehicle A and in the travel direction.

Each of the camera unit 73, the lidar 74, and the millimeter wave radar 75 is constituted by an autonomous sensor that detects a moving object such as a pedestrian and another vehicle around the vehicle A, and a stationary object such as a fallen object on the road, a traffic signal, a guardrail, a curbstone, a road sign, a road marking, and a lane marker. The camera unit 73, the lidar 74, and the millimeter wave radar 75 sequentially output the detected object information related to the detected moving object and stationary object to the autonomous driving ECU 50.

The camera unit 73 includes a monocular or compound eye front camera that photographs a front area of the vehicle A, and an image processing unit that analyzes the image of the front area photographed by the front camera. The camera unit 73 acquires detected object information by extracting the moving object and the stationary object in the image of the front area.

The lidar 74 emits laser light toward the travel direction of the vehicle A, and acquires detected object information by receiving the laser light reflected by the moving object, the stationary object, or the like existing in the travel direction. The millimeter wave radar 75 emits a millimeter wave toward the travel direction of the vehicle A, and acquires detected object information by receiving the millimeter wave reflected by the moving object, the stationary object, or the like existing in the travel direction. The millimeter wave radar 75 can detect an object located farther than the lidar 74 can detect.

The autonomous driving ECU 50 executes the acceleration/deceleration control and the steering control of the vehicle A in cooperation with the vehicle control ECU 80 so as to exhibit the autonomous driving function capable of executing the driving operation of the vehicle A instead of the driver. The autonomous driving ECU 50 mainly includes a computer having a main processor (CPU) 51, a graphic processor (GPU) 52, a RAM 53, a storage medium 54, and an input/output interface 55. The autonomous driving ECU 50 can execute the autonomous driving program, the drive mode switch program, and the like stored in the storage medium 54 using the processors 51 and 52. The autonomous driving ECU 50 has a travel environment recognition unit 61, a travel plan generation unit 62, a drive mode switch control unit 63, an ECU communication unit 64, and an HCU communication unit 65 as functional blocks related to the autonomous driving based on the autonomous driving program and the drive mode switch program.

The travel environment recognition unit 61 recognizes the travel environment of the vehicle A by combining the position information acquired from the GNSS receiver 71, the map data acquired from the map database 72, the detected object information acquired from each autonomous sensor, and the like. The travel environment recognition unit 61 recognizes the shape and a moving state of the object around the vehicle A, particularly within the detection range of each autonomous sensor, based on the integration result of the detected object information and combines the shape and the moving state of the object with the position information and the map data. With this configuration, the travel environment recognition unit 61 generates a virtual space that reproduces the actual travel environment in three dimensions.

The travel plan generation unit 62 generates a travel plan for autonomous travel of the vehicle A by the autonomous driving function based on the travel environment recognized by the travel environment recognition unit 61. As a travel plan, a long and medium term travel plan and a short term travel plan are generated. In the long and medium term travel plan, a route for directing the vehicle A to the destination set by the driver is defined. The schedule of planned drive mode switch from the autonomous driving function to the driver is mainly set based on the long and medium term travel plan. In the short term travel plan, a planned travel route for realizing a travel according to the long and medium term travel plan is defined by using the virtual space around the vehicle A generated by the travel environment recognition unit 61. Specifically, a steering for lane keeping and lane change, acceleration/deceleration for speed adjustment, sudden braking for collision avoidance, and the like are determined and executed based on the short term travel plan.

The drive mode switch control unit 63 controls the switch of the control right related to the driving operation between the autonomous driving function and the driver. The drive mode switch control unit 63 starts the operation of the autonomous driving function by detecting the switch operation to the autonomous driving by the driver in the area where the autonomous driving can be executed. The drive mode switch control unit 63 switches from the autonomous driving to the manual drive by the driver as planned before the end of the area capable of autonomous driving by the reference to the long and middle term travel plan. Even when the travel environment recognition unit 61 accidentally or suddenly has difficulty in recognizing the travel environment, so that the travel plan generation unit 62 has difficulty in generating the short term travel plan, the drive mode switch control unit 63 switches from the autonomous driving to the manual drive.

The ECU communication unit 64 executes an output processing of the information to the vehicle control ECU 80 and an acquisition processing of the information from the vehicle control ECU 80. Specifically, the ECU communication unit 64 generates the vehicle control information item for instructing acceleration/deceleration and steering according to the planned travel route defined by the travel plan generation unit 62, and sequentially outputs the vehicle control information item together with the drive state information item (described later) indicating the operation state of the autonomous driving to the vehicle control ECU80. The ECU communication unit 64 is capable of correcting the content of the vehicle control information item by sequentially acquiring the state information indicating the control state of the vehicle actuator group 90 from the vehicle control ECU 80.

The ECU communication unit 64 has an operation information acquisition block 64*a* as a sub functional block. The operation information acquisition block 64*a* sequentially acquires the signal output from the sensors 44 to 46*b* and the like as the operation information item related to driving operation. The operation information acquisition block 64*a* sequentially acquires the detection information item indicating the gripping state of the steering wheel 16 detected by the grip sensor 47. The operation information item and the detection information item are provided to the drive mode switch control unit 63, and are used at the time of the drive mode switch from the autonomous driving function to the driver.

The HCU communication unit 65 executes an output processing of the information to the HCU 20 and an acquisition processing of the information from the HCU 20. The HCU communication unit 65 has a drive mode switch request block 65*a* and a detection information acquisition block 65*b* as sub functional blocks.

The drive mode switch request block 65*a* generates the switch request information for requesting the drive mode to switch from the autonomous driving function to the driver based on the drive mode switch schedule generated by the drive mode switch control unit 63, and outputs the switch request information to the HCU 20. The drive mode switch request block 65*a* requests the driver to switch the drive mode by controlling the notification device 10 in cooperation with the HCU 20.

The detection information acquisition block 65*b* sequentially acquires, from the HCU 20, the plurality of detection information items based on the detection result of the seat pressure distribution sensor 39 and the DSM 40. The detection information item is provided to the drive mode switch control unit 63, and is used at the time of the drive mode switch from the autonomous driving function to the driver.

Next, the details of the drive mode switch control by the drive mode switch control unit 63 described above will be further described. The drive mode switch control unit 63 includes a drive state switch block 63*a*, an attitude determination block 63*b*, and an approved target setting block 63*c* as sub functional blocks that control switching from the autonomous driving to the manual drive. First, the functions of these sub functional blocks will be described based on FIG. 1 and FIG. 3.

The drive state switch block 63*a* switches the drive mode of the vehicle A among a plurality of predetermined drive modes (see FIG. 3) by the control of transitioning the operation state of the autonomous driving function. The plurality of drive modes switched by the drive state switch block 63*a* includes at least a coordination driving mode and an autonomous retraction mode in addition to the manual driving mode and the normal autonomous driving mode. The present drive mode set by the drive state switch block 63*a* is notified to the information processing unit 31 of the HCU 20 and the drive information acquisition unit 80*a* of the vehicle control ECU 80 as the drive state information item.

In the manual driving mode, the autonomous driving function is stopped, and the driver controls the travel of the vehicle A. The vehicle control ECU 80 that acquires the drive state information item indicative of being in the manual driving mode causes the actuator control unit 80*b* to generate the control signal according to the operation information item acquired from each of the sensors 44 to 46*b*, and transmits the control signal to the vehicle actuator group 90.

In the autonomous driving mode, the autonomous driving function controls the travel of the vehicle A. The vehicle control ECU 80 that acquires the drive state information item indicative of being in the autonomous driving mode causes the actuator control unit 80*b* to generate the control signal according to the vehicle control information item acquired from the autonomous driving ECU 50, and transmits the control signal to the vehicle actuator group 90.

The coordination driving mode is a specific one of the autonomous driving mode. Thus, in the coordination driving mode, the autonomous driving function is operating. In the coordination driving mode, the travel of the vehicle A is controlled by coordinating the control of the autonomous driving function and the driving operation by the driver. The vehicle control ECU 80 that acquires the drive state information item indicative of being in the coordination driving mode generates the control signal based on the operation information item acquired from each of the sensors 44 to 46*b* and the vehicle control information item acquired from the autonomous driving ECU 50, and outputs the control signal to the vehicle actuator group 90.

Specifically, when the driving force indicated by the drive state information item and the driving force indicated by the operation information item are different from each other, the actuator control unit 80*b* generates the control signal based on the greatest driving force of the two driving forces. In addition, when the steering target value indicated by the drive state information item and the actual steering angle indicated by the operation information item are different from each other, the actuator control unit 80*b* outputs the control signal that causes the torque of the steering actuator to increase or decrease so that the steering target value approaches the actual steering angle.

The autonomous retraction mode is another one of the autonomous driving mode. Thus, in the cooperative drive mode, the autonomous driving function is operating. The autonomous retraction mode is executed when the transition of control right from the autonomous driving function to the driver is not desired. The vehicle A in the autonomous retraction mode automatically travels to a stop position searched by the autonomous driving ECU 50, and stops at the stop position. The vehicle control ECU 80 that acquires the drive state information item indicative of being in the autonomous retraction mode basically ignores the operation information item acquired from each of the sensors 44 to 46b, and outputs the control signal based on the vehicle control information item acquired from the autonomous driving ECU 50.

In the vehicle A on which the autonomous driving function is operating, the drive state switch block 63a detects the driving operation of the driver related to a handover and an override of the control right based on the operation information item acquired by the operation information acquisition block 64a. The handover represents one of the drive mode switches in which the control right transitions to the driver. In the handover, when the autonomous driving ECU 50 determines that the autonomous driving cannot continue, the autonomous driving ECU 50 requests the driver to switch the driving and the driver performs the driving operation in response to the request. On the other hand, the override represents one of the drive mode switches in which the control right transitions to the driver. In the override, while the vehicle A is travel by the autonomous driving function, the driver performs the driving operation by own intention. The handover is the transition from the autonomous driving function to the driver based on the determination of the system. The override is the transition from the autonomous driving function to the driver based on the determination of the driver.

The attitude determination block 63b acquires the plurality of detection information items provided to the operation information acquisition block 64a and the detection information acquisition block 65b, and individually determines whether each detection information items indicates a state appropriate for the driving operation. Specifically, the attitude determination block 63b acquires the pressure distribution data obtained by the seat pressure distribution sensor 39 and the data indicating a foot state obtained by the foot camera 43 as detection information items indicating a driver's seating state. When the acquired pressure distribution data approximates reference distribution data indicating a correct sitting attitude, and the driver's right foot faces one of the pedals 14 and 15, the attitude determination block 63b determines that the seating state is appropriate for the driving operation (see conditions A to D in FIG. 4).

In addition, the attitude determination block 63b acquires the detection information item indicating the driver's visual line direction and face direction. When being capable of estimating that the driver visually recognizes the traveling direction of the vehicle A based on the driver's visual line direction and the face direction, the attitude determination block 63b determines that the driver's visual line direction and the face direction are appropriate for the driving operation (see conditions A, C, E and G in FIG. 4).

The attitude determination block 63b acquires, as the detection information item indicating the gripping state, at least one of the detection result of the steering torque sensor 46b and the grip sensor 47, and the data of the gripping state based on the imaging data of the hand camera 42. The attitude determination block 63b may acquire the plurality of detection information items indicating the gripping state. When being capable of estimating that the steering wheel 16 is correctly gripped based on the detection information item, the attitude determination block 63b determines that the gripping state is appropriate for the driving operation (see conditions A, B, E and F in FIG. 4).

The attitude determination block 63b updates the determination results indicating that the seating state, the visual line direction and the face direction, and the gripping state is appropriate based on the latest detection information items at a predetermined period. The update periods of the determination results may be appropriately set based on the measurement period of each sensor related to the detection of the corresponding detection information item, and may be different for each determination result. As an example, the determination result of the seating state may be updated every 10 milliseconds, the determination result of the visual line direction and the face direction may be updated every 50 milliseconds, and the determination result of the gripping state may be updated every 5 milliseconds.

The approved target setting block 63c sets each of the plurality of operation targets including the accelerator pedal 14, the brake pedal 15, and the steering wheel 16 as an approved operation target or a disapproved operation target based on whether each detected information item indicates a state appropriate for the driving operation. The driving operation to the approved operation target in the autonomous driving mode is approved as the override. The driving operation to the disapproved operation target in the autonomous driving mode is not approved as the override.

Specifically, when the attitude determination block 63b determines that the seating state is appropriate for the driving operation, the approved target setting block 63c sets the brake pedal 15 as the approved operation target (see conditions A to D in FIG. 4). When the attitude determination block 63b determines that the seating state is appropriate for the driving operation, the approved target setting block 63c sets at least the brake pedal 15 as the approved operation target even when another detection information items indicating that the visual line direction and the face direction, and gripping state are determined not to be appropriate for the driving operation. When the attitude determination block 63b determines that the seating state is not appropriate for the driving operation, the approved target setting block 63c sets the accelerator pedal 14 and the steering wheel 16 in addition to the brake pedal 15 as the disapproved operation targets (see conditions E to F in FIG. 4).

When the attitude determination block 63b determines that the visual line direction and the face direction are not appropriate for the driving operation, the approved target setting block 63c sets the accelerator pedal 14 as the disapproved operation target (see conditions B and D in FIG. 4). When the attitude determination block 63b determines that at least one of the visual line direction and the face direction is not appropriate for the driving operation, the approved target setting block 63c sets the accelerator pedal 14 as the disapproved operation target even when another detection information item is determined to be appropriate for the driving operation. When the attitude determination block 63b determines that the seating state is appropriate and the visual line direction and the face direction are also appropriate for the driving operation, the approved target setting block 63c sets the accelerator pedal 14 as the approved operation target (see conditions A and C in FIG. 4).

When the attitude determination block 63b determines that the gripping state is not appropriate for the driving operation, the approved target setting block 63c sets the steering wheel 16 as the disapproved operation target (see conditions C and D in FIG. 4). When the attitude determination block 63*b* determines that the gripping state is not appropriate for the driving operation, the approved target setting block 63*c* sets the steering wheel 16 as the disapproved operation target even when another detection information item is determined to be appropriate for the driving operation. When the attitude determination block 63*b* determines that the seating state is appropriate and the gripping state is also appropriate for the driving operation, the approved target setting block 63*c* sets the steering wheel 16 as the approved operation target (see conditions A and C in FIG. 4).

Figure 3:
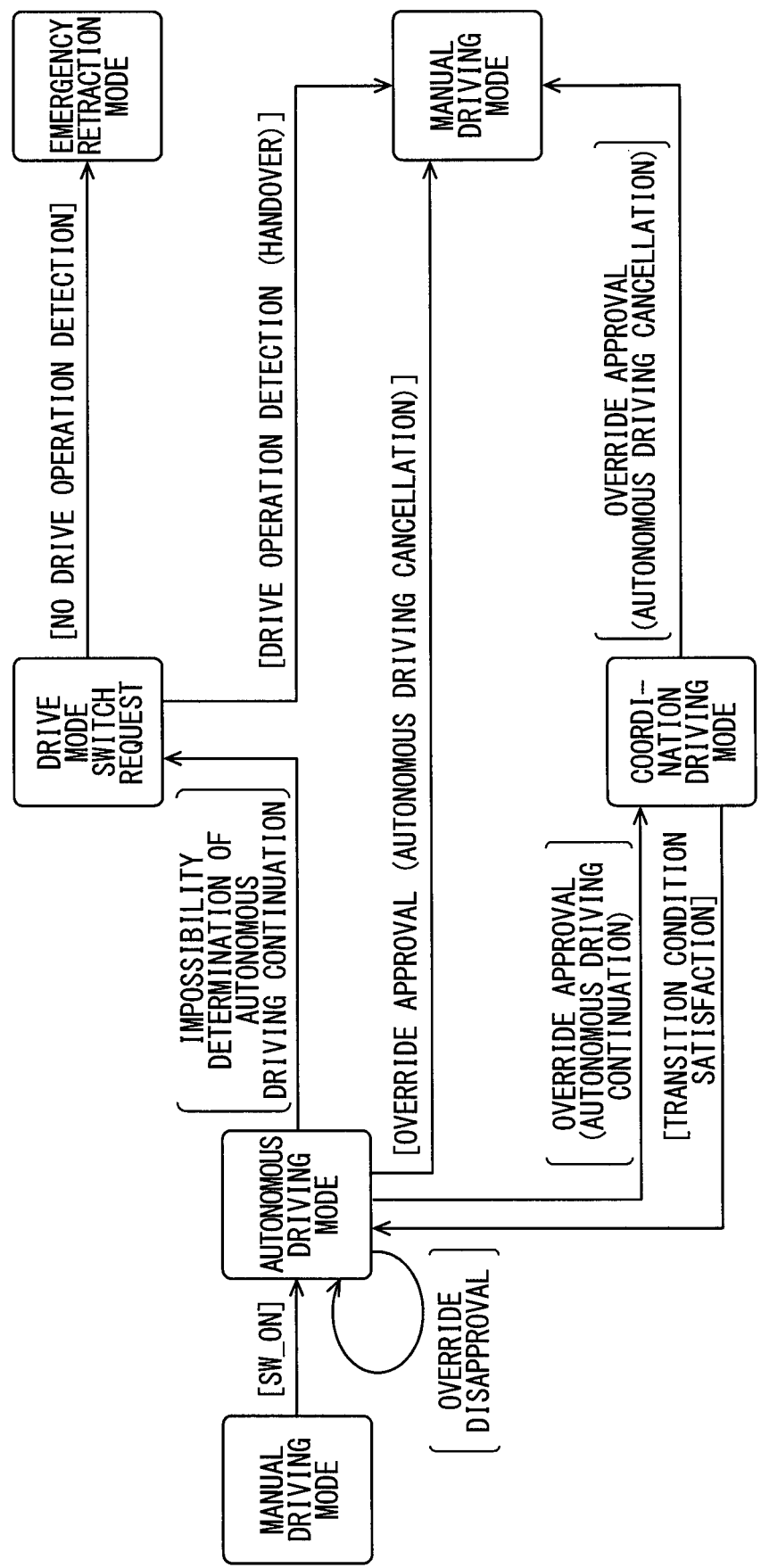
FIG. 3 is a state transition diagram showing an overview of a drive mode transition executed by a drive mode switch control unit.

Next, the details of the transition of the drive mode by the drive state switch block 63*a* will be further described based on FIGS. 3 and 4, with reference to FIG. 1.

The drive state switch block 63*a* switches the drive mode from the manual driving mode to the normal autonomous driving mode in response to an input of a switch for instructing the start of autonomous driving provided in an operation system such as the steering switch. In the autonomous driving mode, when it is determined that the continuation of the autonomous driving is impossible, the autonomous driving transitions to the mode that executes a drive mode switch request. When the driver notices such a drive mode switch request, the driver starts inputting the driving operation. Based on the detection of the driving operation, the drive state switch block 63*a* stops the drive mode switch request, cancels the autonomous driving function, and switches from the autonomous driving mode to the manual drive mode. As described above, the handover by the driver is completed.

When a predetermined request execution time has elapsed without the detection of the driving operation after the execution of the drive mode switch request, the drive state switch block 63*a* switches from the autonomous driving mode to the autonomous retraction mode. With this configuration, the vehicle A sequentially starts the search for the stop position and the travel to the stop position by the coordination control of the autonomous driving ECU 50 and the vehicle control ECU 80. The above-described control effectively functions when the driver has difficulty in driving. The request execution time is set so that the vehicle A does not go out of the autonomous driving area without switching to the manual driving mode. For example, the request execution time is set to approximately 4 seconds.

As described above, whether the override is approved when there is no request for the drive mode switch is individually set to each operation target based on the driving attitude of the driver. The driving operation input to the operation target set as the disapproved operation target by the approved target setting block 63*c* between the plurality of operation targets is not approved as the override. Even when the driving operation is input to the disapproved operation target, the drive state switch block 63*a* continues the autonomous driving mode.

The driving operation input to the approved operation target is approved as the override. For example, when the driving operation is input to the brake pedal 15 set as the approved operation target, the drive state switch block 63*a* cancels the autonomous driving by the braking operation of the driver as a trigger. With the stop of the autonomous driving function, the drive mode of the vehicle A is switched from the autonomous driving mode to the manual driving mode.

Similarly, when the driving operation is input to the steering wheel 16 set as the approved operation target, the drive state switch block 63*a* switches the drive mode by the steering operation of the driver as a trigger. Specifically, a steering threshold value is preliminary set in the drive state switch block 63*a*. The steering threshold value is a value to be compared with the operation value related to the driving operation input to the steering wheel 16. As the operation value, for example, the change amount in the steering angle (hereinafter referred to as "steering amount") caused by the driver's input, the steering torque, the steering continuation time, or the like is employed. As an example, when the steering amount is employed as the operation value, the steering threshold value is defined corresponding to the steering amount. In this case, when the steering amount is greater than the steering threshold value, the drive state switch block 63*a* stops the autonomous driving function and switches the autonomous driving mode to the manual driving mode.

When the steering amount is equal to or less than the steering threshold value, the drive state switch block 63*a* continues the autonomous driving function and switches the autonomous driving mode to the coordination driving mode. In the coordination driving mode, when the brake operation is input to the brake pedal 15 set as the approved operation target or the steering operation in which the steering amount exceeds the steering threshold value is input, the drive state switch block 63*a* cancels the autonomous driving. With this configuration, the operation mode is switched from the coordination driving mode to the manual driving mode.

When the transition condition to the autonomous driving mode is satisfied without the detection of the driving operation to the approved operation target after the switch to the coordination driving mode, the drive state switch block 63*a* switches the coordination driving mode to the autonomous driving mode. It is determined that the transition condition to the autonomous driving mode is satisfied, for example, when a predetermined restart standby period (for example, approximately 3 seconds) has elapsed.

With the transition of the drive mode, when the vehicle A performs the autonomous driving and the driver tries to overtake a large vehicle travel in an adjacent lane, the vehicle A is capable of temporarily moving farther from the large vehicle in the lane by the steering operation without canceling the autonomous driving. The steering threshold value is previously adjusted to a value so that the autonomous driving is not canceled by the above-described steering operation that does not cross the lane.

As another example, it is possible to employ both the steering torque and the steering continuation time as the operation value. In this case, a torque threshold value corresponding to the steering torque and a time threshold value corresponding to the steering continuation time are set as the steering threshold values. When the steering torque that exceeds the torque threshold value (for example, 0.5N) is input for the steering continuation time that exceeds the time threshold value (for example, 3 seconds), the drive state switch block 63*a* stops the autonomous driving function and switches the autonomous driving mode to the manual driving mode. In this control, a series of drive mode switches in which the autonomous driving mode is switched stepwise to the manual driving mode via the coordination driving mode is realized by the steering operation.

When the driving operation is input to the accelerator pedal 14 set as the approved operation target, the drive state switch block 63*a* continues the autonomous driving function and switches the autonomous driving mode to the coordination driving mode by the throttle operation of the driver as a trigger. In this case, when the predetermined restart standby period has elapsed without the detection of the driving operation to the approved operation target after the switching to the coordination driving mode, the drive mode of the vehicle A is returned from the coordination driving mode to the autonomous driving mode.

The details of the override control processing executed by the autonomous driving ECU 50 in order to realize the above-described override will be described based on FIGS. 5 to 9, with reference to FIG. 1 and FIG. 4. The override control processing shown in FIGS. 5 to 9 is started by the drive mode switch control unit 63 based on the switching from the manual driving mode to the autonomous driving mode. The override control processing is repeated with a period (for example, 50 to 100 milliseconds) that does not cause the driver to feel uncomfortable due to the delay in control.

At S101, in the autonomous driving mode, the plurality of detection information items related to the driving attitude of the driver are acquired, and the processing proceeds to S102. At S102, the autonomous driving ECU 50 individually determines that each detection information item acquired at S101 indicates the state appropriate for the driving operation. Specifically, at S102, the autonomous driving ECU 50 alternatively selects the condition among the conditions A to H based on the visual line direction and the face direction, the gripping state of the steering wheel, and the seating condition.

At S102, the autonomous driving ECU 50 determines that the present driving attitude of the driver corresponds to the condition A, the processing proceeds to S103. At S103, the autonomous driving ECU 50 individually sets each operation target as the approved operation target or the disapproved operation target, and the processing proceeds to S104. At S103 when the condition A is determined at S102, the accelerator pedal 14, the brake pedal 15, and the steering wheel 16 are set as the approved operation targets.

At S104, the autonomous driving ECU 50 executes the acquisition processing of the operation information item, and determines whether the driving operation input to each operation target has been detected. At S104, when the autonomous driving ECU 50 determines that the driving operation is not input to any of the operation targets, the processing returns to S101. On the other hand, at S104, when the autonomous driving ECU 50 determines that a driving operation intended to execute the override is input to any of the operation targets, the processing proceeds to S105.

At S105, the autonomous driving ECU 50 identifies the operation target to which the override operation is input among the plurality of operation targets. At S105, when the autonomous driving ECU 50 determines that the override operation is input to the brake pedal 15, the processing proceeds to S106. At S106, the autonomous driving ECU 50 approves the override operation input to the brake pedal 15, the processing proceeds to S113. At S113, the autonomous driving ECU 50 stops the autonomous driving function, switches the drive mode of the vehicle A from the autonomous driving mode to the manual driving mode, and terminates the override control processing.

At S105, when the autonomous driving ECU 50 determines that the override operation is input to the accelerator pedal 14, the processing proceeds to S107. At S107, the autonomous driving ECU 50 switches the drive mode of the vehicle A from the autonomous driving mode to the coordination driving mode, approves the override operation input to the accelerator pedal 14, and the processing proceeds to S108. At S108, the autonomous driving ECU 50 executes the acceleration processing corresponding to the override operation approved at S107, and the processing returns to S101.

At S105, when the autonomous driving ECU 50 determines that the override operation is input to the steering wheel 16, the processing proceeds to S109. At S109, the autonomous driving ECU 50 calculates the steering amount input to the steering wheel 16 by the steering operation, and the processing proceeds to S110. At S110, the autonomous driving ECU 50 compares the steering amount of the steering wheel 16 with the steering threshold value. At S110, when the autonomous driving ECU 50 determines that the steering amount exceeds the steering threshold value, the processing proceeds to S111. At S109 and S110, the autonomous driving ECU 50 may calculate the steering torque and the steering continuation time, and respectively compare the torque threshold value and the time threshold value.

At S111, the autonomous driving ECU 50 resets the calculation of the steering amount, and the processing proceeds to S112. At S112, the autonomous driving ECU 50 approves the override operation input to the steering wheel 16, the processing proceeds to S113. At S113, the autonomous driving ECU 50 switches the drive mode of the vehicle A from the autonomous driving mode to the manual driving mode, and terminates the override control processing.

At S110, when the autonomous driving ECU 50 determines that the steering amount is equal to or less than the steering threshold value, the processing proceeds to S114. At S114, the autonomous driving ECU 50 switches the drive mode of the vehicle A from the autonomous driving mode to the coordination driving mode, approves the override operation input to the steering wheel 16, and the processing proceeds to S115. At S115, the autonomous driving ECU 50 executes the steering processing corresponding to the override operation approved at S114, and the processing returns to S101.

Figure 6:
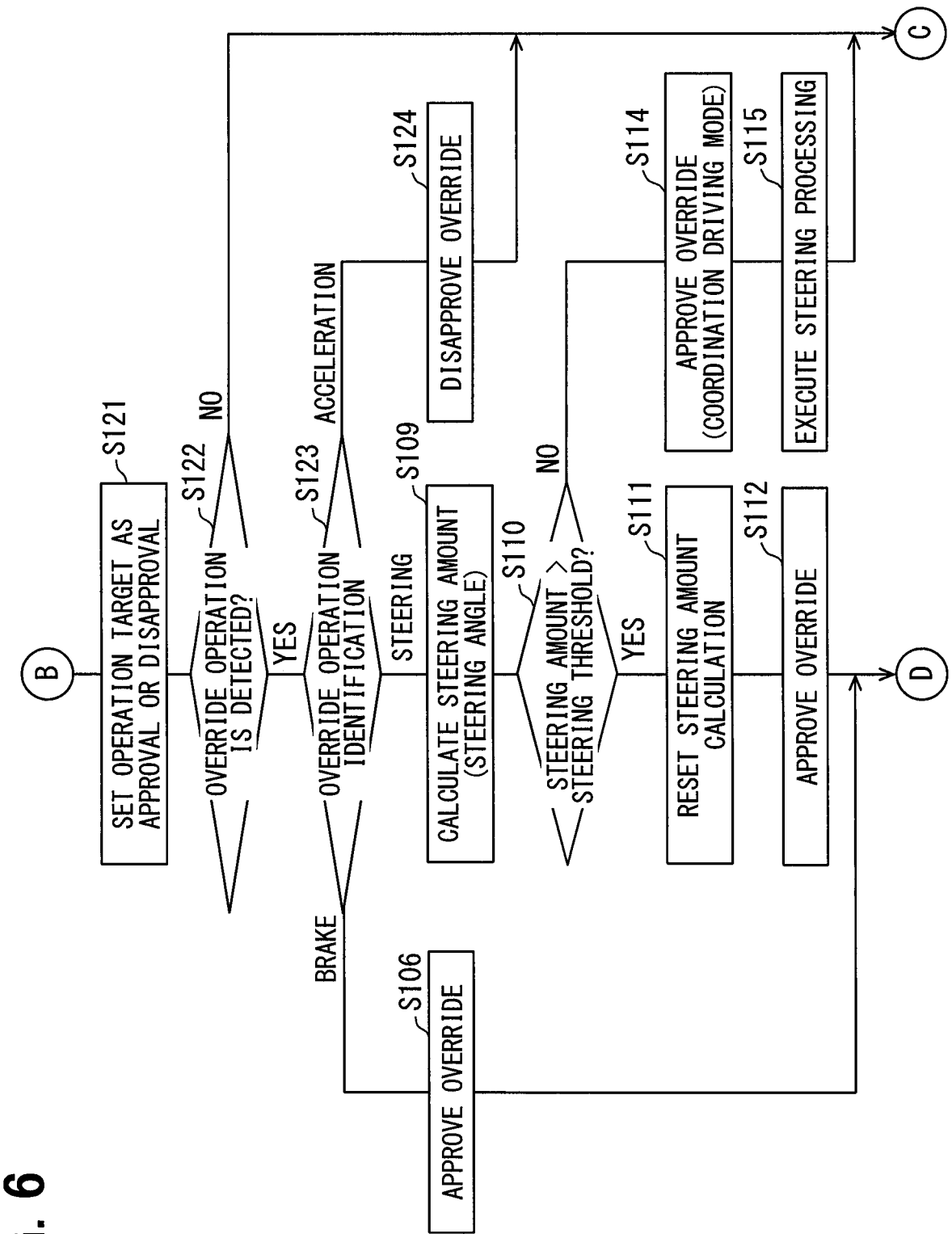
FIG. 6 is a flowchart showing an override control processing in which a condition B shown in FIG. 4 is selected.

At S102, the autonomous driving ECU 50 determines that the present driving attitude of the driver corresponds to the condition B, the processing proceeds to S121 shown in FIG. 6. At S121, similarly to at S103, the autonomous driving ECU 50 sets the approved operation target or the disapproved operation target to each operation target, and the processing proceeds to S122. At S121, the brake pedal 15 and the steering wheel 16 are set as the approved operation target, and the accelerator pedal 14 is set as the disapproved operation target.

At S122, the autonomous driving ECU 50 executes the acquisition processing of the operation information item, and determines whether the driving operation input to each operation target has been detected. At S122, when the autonomous driving ECU 50 determines that the driving operation is not input to any of the operation targets, the processing returns to S101. On the other hand, at S122, when the autonomous driving ECU 50 determines that the driving operation intended to execute the override is input to any of the operation targets, the processing proceeds to S123.

At S123, the autonomous driving ECU 50 identifies the operation target to which the override operation is input among the plurality of operation targets. At S123, the autonomous driving ECU 50 determines that the override operation is input to the brake pedal 15, the processing proceeds to S106. At S106, the autonomous driving ECU 50 approves the override operation input to the brake pedal 15, and the processing proceeds to S113.

At S123, when the autonomous driving ECU 50 determines that the override operation is input to the accelerator pedal 14, the processing proceeds to S124. At S124, the autonomous driving ECU 50 maintains the autonomous driving mode without approving the driving operation on the accelerator pedal 14, which is set as the disapproved operation target, as the override operation, and returns to S110. At S123, determining that the override operation is input to the steering wheel 16, the autonomous driving ECU 50 executes the above-described operations at S109 to S112, S114, and S115, and approves the override operation to steering wheel 16.

Figure 7:
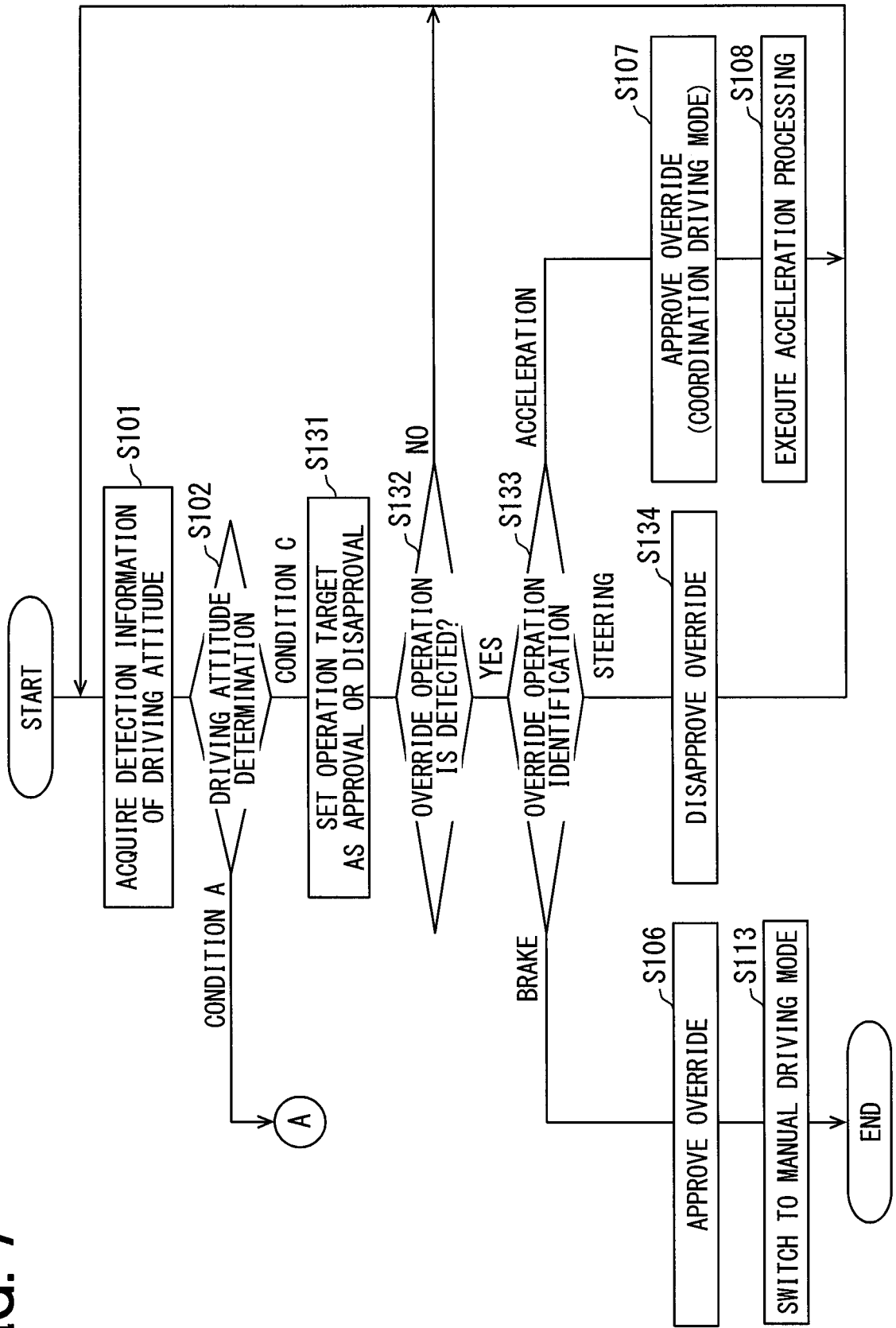
FIG. 7 is a flowchart showing an override control processing in which a condition C shown in FIG. 4 is selected.

At S102, the autonomous driving ECU 50 determines that the present driving attitude of the driver corresponds to the condition C, the processing proceeds to S131 shown in FIG. 7. At S131, similarly to at S103, the autonomous driving ECU 50 sets the approved operation target or the disapproved operation target to each operation target, and the processing proceeds to S132. At S131, the brake pedal 15, and the accelerator pedal 14 are set as approved operation target, and the steering wheel 16 is set as the disapproved operation target.

At S132, the autonomous driving ECU 50 determines whether the driving operation is detected. When the autonomous driving ECU 50 determines that the driving operation is not input to any of the operation targets, the processing returns to S101. At S132, when the autonomous driving ECU determines that the override operation is input to at least one of the operation targets, the processing proceeds to S133. At S133, the autonomous driving ECU 50 identifies the operation target input to which the override operation has been input.

At S133, when determining that the override operation is input to the brake pedal 15, the autonomous driving ECU 50 approves the brake override from the driver by sequentially executing the operations at S106 and S113 and terminates the override control processing. At S133, when determining that the override operation is input to the accelerator pedal 14, the autonomous driving ECU 50 approves the accelerator override from the driver by sequentially executing the operations at S107 and S108 and the processing returns to S101.

At S133, when the autonomous driving ECU 50 determines that the override operation is input to the steering wheel 16, the processing proceeds to S134. At S134, the autonomous driving ECU 50 maintains the autonomous driving mode without approving the driving operation on the steering wheel 16, which is set as the disapproved operation target, as the override operation, and returns to S110.

Figure 8:
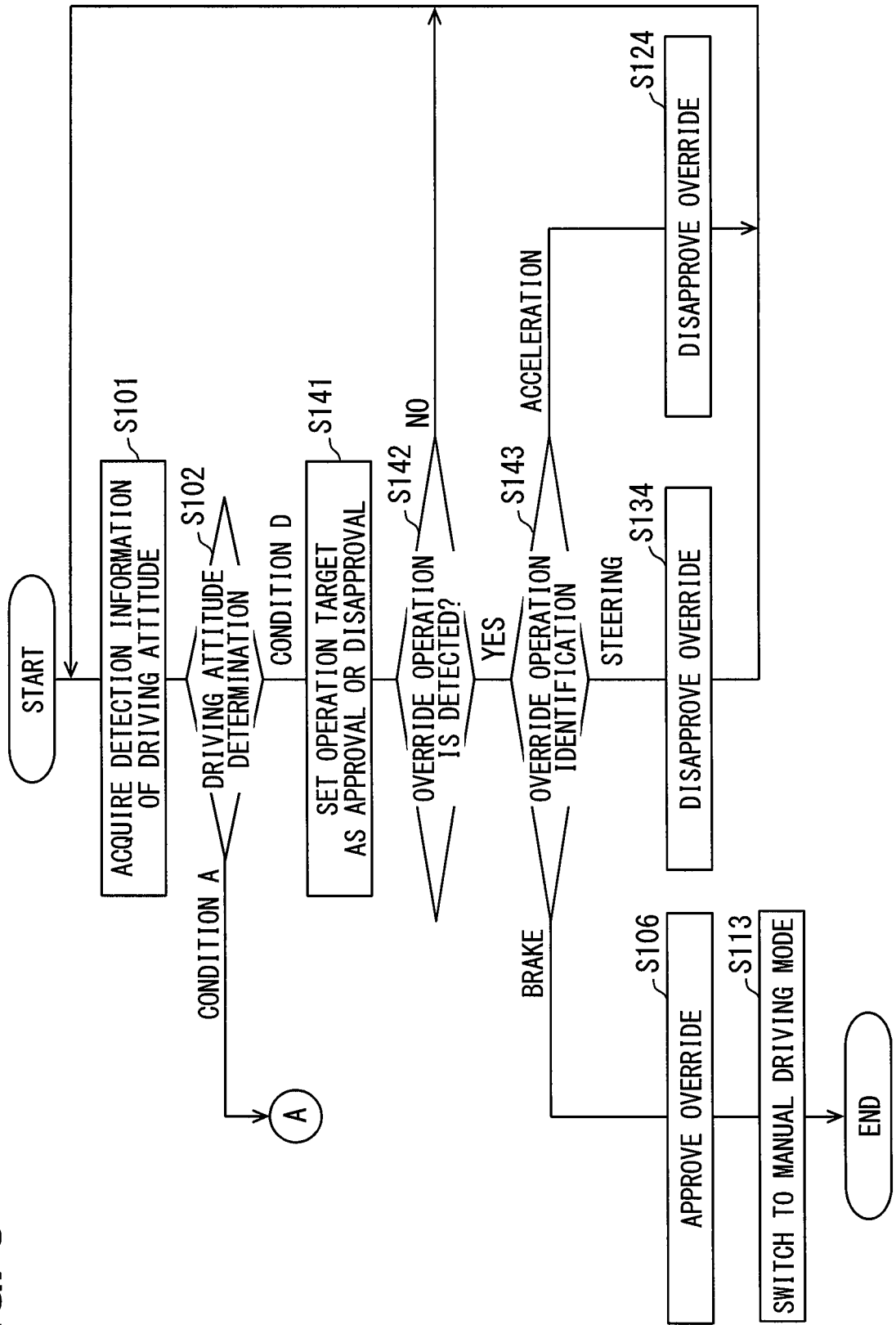
FIG. 8 is a flowchart showing an override control processing in which a condition D shown in FIG. 4 is selected.

At S102, the autonomous driving ECU 50 determines that the present driving attitude of the driver corresponds to the condition D, the processing proceeds to S141 shown in FIG. 8. At S141, similarly to at S103, the autonomous driving ECU 50 sets the approved operation target or the disapproved operation target to each operation target, and the processing proceeds to S142. At S141, the brake pedal 15 is set as approved operation target, and the accelerator pedal 14 and the steering wheel 16 are set as the disapproved operation target.

At S142, the autonomous driving ECU 50 determines whether the driving operation is detected. When the autonomous driving ECU 50 determines that the driving operation is not input to any of the operation targets, the processing returns to S101. At S142, when the autonomous driving ECU 50 determines that the override operation is input to at least one of the operation targets, the processing proceeds to S143. At S143, the autonomous driving ECU 50 identifies the operation target to which the override operation has been input.

At S143, when determining that the override operation is input to the brake pedal 15, the autonomous driving ECU 50 approves the brake override from the driver by executing the operations at S106 and S113, and terminates the override control processing. At S143, the autonomous driving ECU 50 determines that the override operation is input to the accelerator pedal 14, the processing proceeds to S124. At S124, the autonomous driving ECU 50 does not accept the override operation to the accelerator pedal 14, and the processing returns to S101. Similarly, at S143, the autonomous driving ECU 50 determines that the override operation is input to the steering wheel 16, the processing proceeds to S134. At S134, the autonomous driving ECU 50 does not accept the override operation to the steering wheel 16, and the processing returns to S101.

Figure 9:
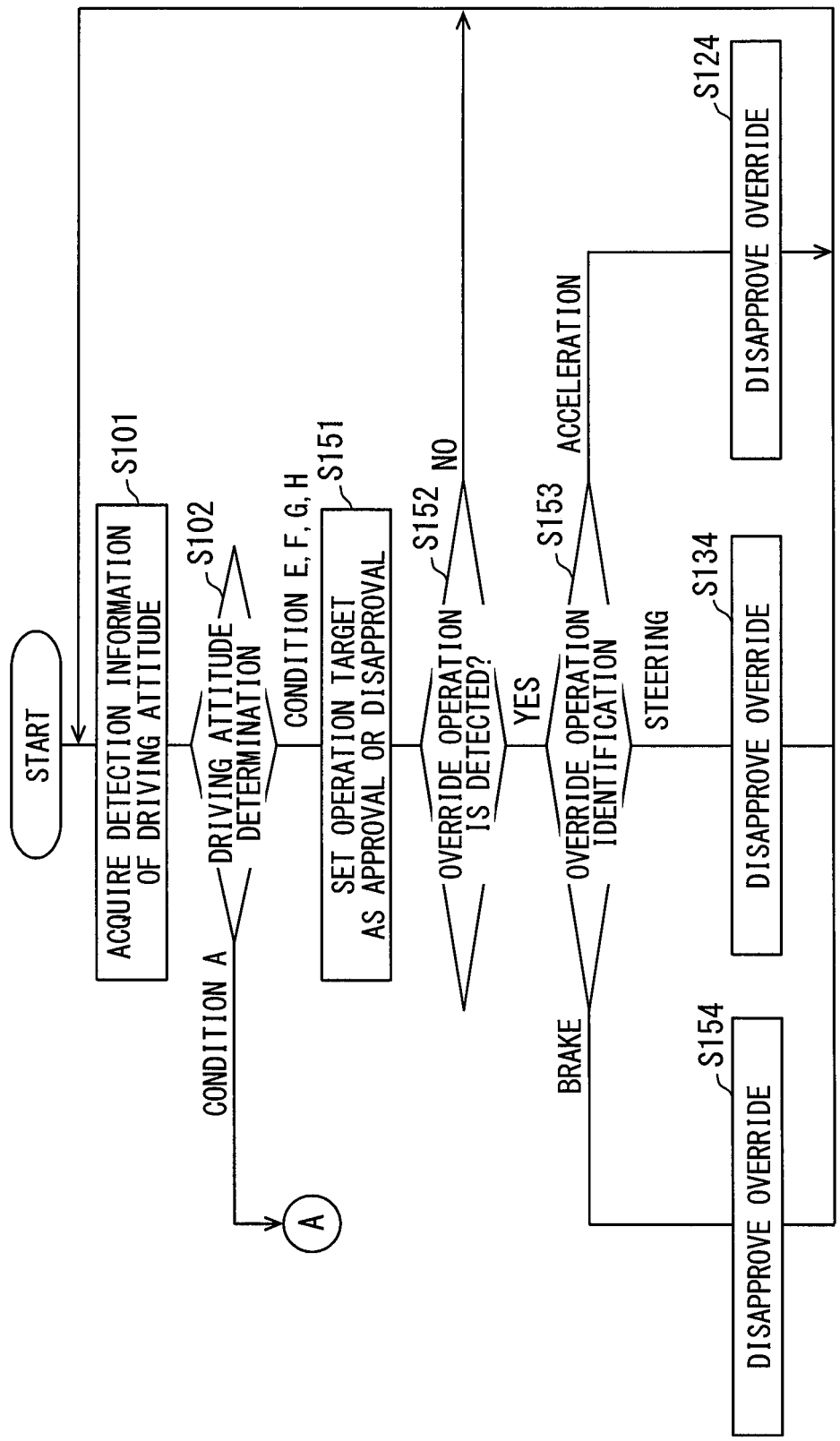
FIG. 9 is a flowchart showing an override control processing in which each of conditions E to H shown in FIG. 4 is selected.

At S102, the autonomous driving ECU 50 determines that the present driving attitude of the driver corresponds to any one of the conditions E to H, the processing proceeds to S151 shown in FIG. 9. At S151, all operation targets are set as the disapproved operation target, and the processing proceeds to S152. At S152, the autonomous driving ECU 50 determines whether the driving operation is detected. When the autonomous driving ECU 50 determines that the driving operation is not input to any of the operation targets, the processing returns to S101. At S152, when the autonomous driving ECU 50 determines that the override operation is input to at least one of the operation targets, the processing proceeds to S153. At S153, the autonomous driving ECU 50 identifies the operation target to which the override operation has been input.

At S153, the autonomous driving ECU 50 determines that the override operation is input to the brake pedal 15, the processing proceeds to S154. At S154, the autonomous driving ECU 50 maintains the autonomous driving mode without approving the override operation to the brake pedal 15, and the processing returns to S101. Similarly, at S153, the autonomous driving ECU 50 determines that the override operation is input to the accelerator pedal 14, the processing proceeds to S124. At S124, the autonomous driving ECU 50 does not accept the override operation to the accelerator pedal 14, and the processing returns to S101. Similarly, at S153, the autonomous driving ECU 50 determines that the override operation is input to the steering wheel 16, the processing proceeds to S134. At S134, the autonomous driving ECU 50 does not accept the override operation to the steering wheel 16, and the processing returns to S101.

As described above, in the first embodiment, it is determined whether the plurality of the detection information items related to the driving attitude indicates the driver state appropriate for the driving operation, and the approved operation target or the disapproved operation target is set to each of the plurality of the detection information items based on the determination results. With this configuration, when driving operation to any one of the operation targets is not appropriately performed in the driving attitude, the operation target can be set as the disapproved operation target. Thus, even when an unintended operation is input to the disapproved operation target due to an inappropriate driving attitude, the override is not executed. On the other hand, the operation target which is estimated that the driver appropriately performs the driving operation can be set as the approved operation target. As a result, even when the driving attitude is partially inappropriate, the driver can perform the override by the input of the driving operation to the approved operation target. Thus, the configuration can suppress the occurrence of the unintended override, and cause the driver to appropriately perform the drive mode switch.

In addition, in the first embodiment, even when the visual line direction and the face direction are not appropriate for the driving operation but the seating state is appropriate for the driving operation, the brake pedal 15 is set as the approved operation target. Therefore, for example, even when the brake operation is performed with the face turned from the front at a sudden, such a brake operation is reflected in the behavior of the vehicle A as the override operation. As described above, when the brake pedal 15 is set as the approved operation target based on the seating state, the emergency brake override can be appropriately approved.

In the first embodiment, when the override operation is input to the brake pedal 15, switching to the manual driving mode is executed by stopping the autonomous driving function. Therefore, the driver can appropriately respond to the situation and obtain the control right of the vehicle A without receiving the intervention of the autonomous driving function, and decelerate the vehicle A.

Furthermore, in the first embodiment, when the visual line direction and the face direction are not appropriate, the override operation input to the accelerator pedal 14 is not approved. In addition, when the visual line direction or the face direction is not appropriate, the accelerator operation is not approved without being influenced by the state of another driving attitude. Thus, the configuration can suppress the occurrence of the unintended accelerator override, which accelerates the vehicle A by the operation of the accelerator pedal 14 in the state where the driver does not visually recognize the front.

In addition, in the first embodiment, even after the override by the accelerator operation is approved, the autonomous driving function can continue without being canceled. Therefore, the driver continues to be supported by the autonomous driving function even after the override operation input to the accelerator pedal 14 is executed. With this configuration, even after the driver's override is approved, the vehicle A continues the stable traveling by the travel support by the autonomous driving function.

In the first embodiment, when the steering wheel 16 is not appropriately gripped, the override by the steering operation is not approved. In addition, when the grip of the steering wheel 16 is not appropriate, the steering operation is not approved without being influenced by the state of another driving attitude. Thus, the configuration can suppress the occurrence of the unintended steering override, which laterally moves the vehicle A by the steering operation in the state where the driver does not appropriately grip the steering wheel 16.

In the first embodiment, when the steering amount of the steering wheel 16 is equal to or smaller than the steering threshold value, the autonomous driving function continues without being canceled even after the override by the steering operation is approved by the switch to the coordination control mode. Therefore, the driver continues to be supported by the autonomous driving function even after the override operation to the steering wheel 16 is input. With this configuration, even after the driver's override is approved, the vehicle A continues the stable traveling by the steering support by the autonomous driving function.

In the first embodiment, when the steering amount of the steering wheel 16 is greater than the steering threshold value, switching to the manual driving mode is executed by stopping the autonomous driving function. With the above-described appropriate stop of the autonomous driving function, the driver can take over the driving operation from the autonomous driving function without keeping being interfered from the autonomous driving function even when a great amount of the steering angle is required to cope with a situation.

In the first embodiment, the accelerator pedal 14 corresponds to an "accelerator part", the brake pedal 15 corresponds to a "brake part", the steering wheel 16 corresponds to a "steering part", and the steering amount of the steering wheel 16 corresponds to an "operation value". Further, each of the main processor 51 and the graphic processor 52 corresponds to a "processing unit". The drive state switch block 63a corresponds to a "drive state switch unit". The attitude determination block 63b corresponds to an "attitude determination unit". The approved target setting block 63c corresponds to an "approved target setting unit". The operation information acquisition block 64a corresponds to an "operation information acquisition unit". The autonomous driving ECU 50 corresponds to a "drive mode switch control device". The autonomous driving mode corresponds to an "autonomous driving state". The manual driving mode corresponds to a "manual driving state". The coordination driving mode corresponds to a "coordination driving state".

Second Embodiment

Figure 10:
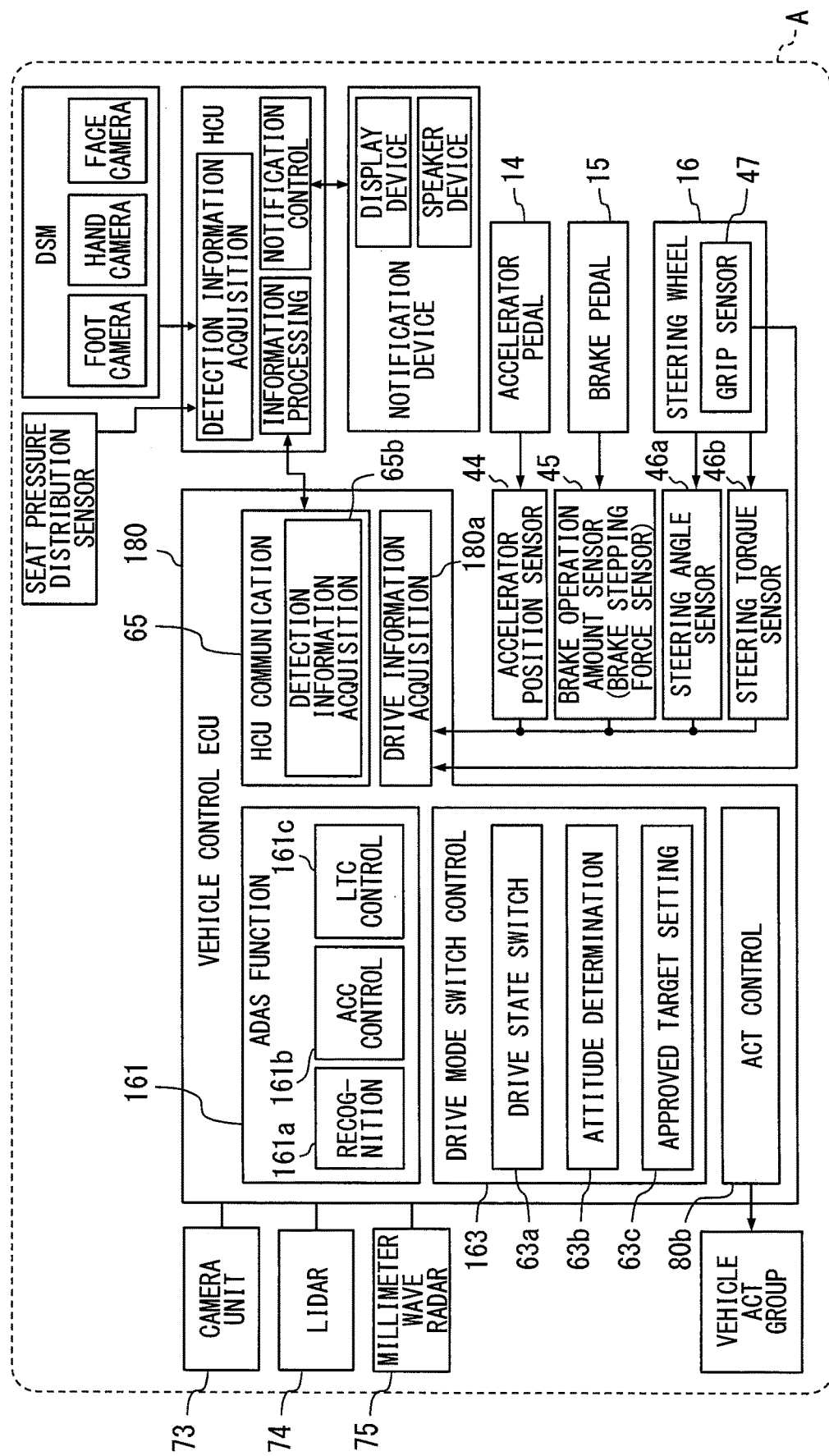
FIG. 10 is a block diagram showing an overview of a configuration related to an autonomous driving according to a second embodiment.
Figure 11:
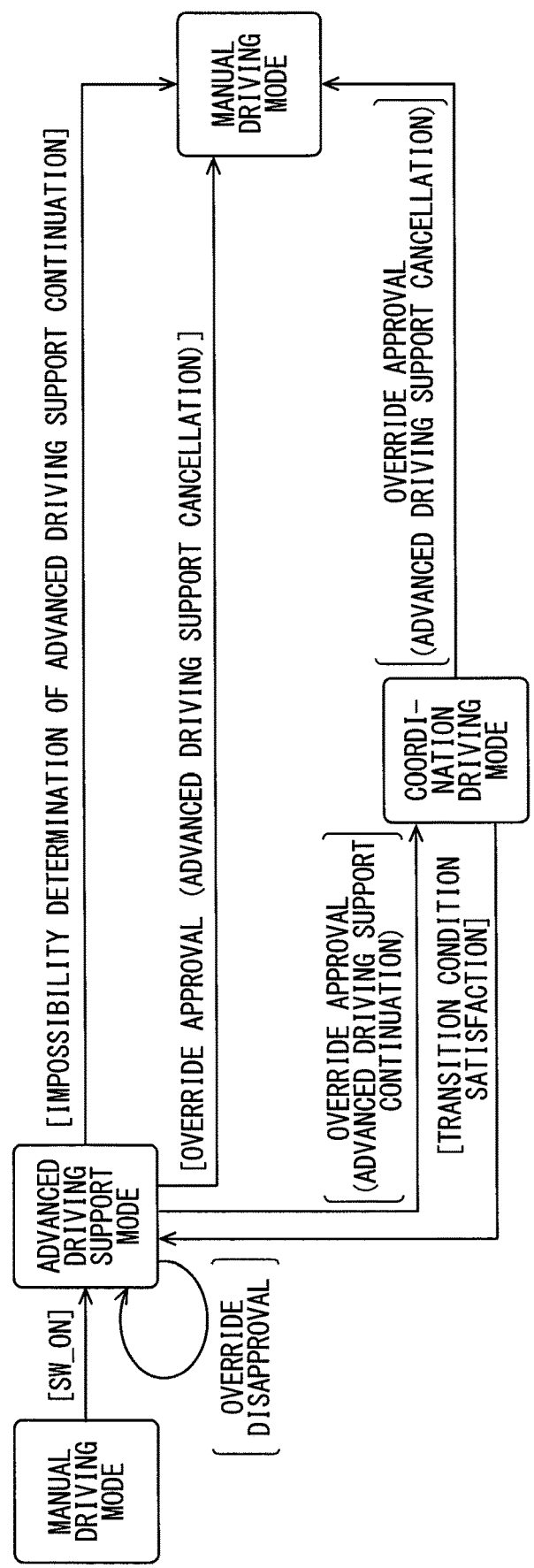
FIG. 11 is a state transition diagram showing an overview of the drive mode transition executed by a drive mode switch control unit of a second embodiment.

A second embodiment of the present disclosure shown in FIGS. 10 and 11 is a modification of the first embodiment. The autonomous driving function mounted on the vehicle A of the second embodiment is a function of semi-autonomous driving realized by a so-called advanced driving support system (hereinafter referred to as "advanced driving support function"). The advanced driving support system referred to the second embodiment is a system on the premise that the driver can drive at any time during the operation of the autonomous driving function. When the advanced driving support system determines that the driving support cannot continue, the drive state transitions to the manual driving mode without the drive mode switch request described in the first embodiment.

The advanced driving support system can execute acceleration, steering, or braking of the vehicle A. In the advanced driving support system, the request for the drive mode switch based on the long and medium term travel plan is not performed. The function of the drive mode switch control device in the vehicle A having such an advanced driving support system is realized by a vehicle control ECU 180.

The vehicle control ECU 180 has a part of the functions of the autonomous driving ECU 50 (see FIG. 1) of the first embodiment, and enables the semi-autonomous driving for the vehicle A. In the vehicle control ECU 180, a drive information acquisition unit 180a, an ADAS function unit 161, and a drive mode switch control unit 163 are constructed as functional blocks, and the actuator control unit 80b and the HCU communication unit 65, each of which is substantially the same as the first embodiment, are also constructed as functional blocks.

The drive information acquisition unit 180a has the function of the operation information acquisition block 64a (see FIG. 1) of the first embodiment. The drive information acquisition unit 180a acquires the operation information items output from the sensors 44 to 46b and the detection information item output from the grip sensor 47. The operation information item and the detection information item are provided to the drive mode switch control unit 163, and are used when the drive mode switches from the autonomous driving function to the driver.

An ADAS (Advanced drive Assistant System) functional unit 161 has a target recognition block 161*a*, an ACC function block 161*b*, and an LTC function block 161*c* as sub functional blocks.

The target recognition block 161*a* detects the relative position and the like of the moving object and the stationary object in the travel direction by integrating the detected object information acquired from the camera unit 73, the lidar 74, and the millimeter wave radar 75. For example, the target recognition block 161*a* can recognize a preceding vehicle, a lane marking, or the like.

The ACC (Adaptive Cruise Control) functional block 161*b* achieves an ACC function. The ACC function block 161*b* controls the travel speed of the vehicle A by adjusting the driving force and the braking force in cooperation with the actuator control unit 80*b* based on the relative position information of the moving object or the stationary object recognized by the target recognition block 161*a*. Specifically, the ACC function block 161*b* causes the vehicle A to cruise at a target speed set by the driver when a leading vehicle is not detected. When the leading vehicle is detected, the ACC function block 161*b* causes the vehicle A to follow the preceding vehicle while maintaining the distance between the preceding vehicle.

The LTC (Lane Trace Control) functional block 161*c* achieves an LTC function. The LTC function block 161*c* controls the steering angle of the steering wheel of the vehicle A by adjusting the steering force in cooperation with the actuator control unit 80*b* based on the shape information of the lane marking in the travel direction acquired from the target recognition block 161*a*. The LTC function block 161*c* causes the vehicle A to travel so as to follow the lane in the travel.

The drive mode switch control unit 163 determines the intention of the driver for the override and stops the operation of the ADAS function unit 161 that realizes the advanced driving support function. The drive mode switch control unit 163 includes the attitude determination block 63*b*, the approved target setting block 63*c*, and the drive state switch block 63*a*, similarly to the first embodiment.

The attitude determination block 63*b* determines whether each of the visual line direction and the face direction of the driver, the gripping state, and the seating state is appropriate for the driving operation based on the plurality of the detection information items acquired from the detection information acquisition block 65*b* of the HCU communication unit 65 and the drive information acquisition unit 180*a*. The attitude determination block 63*b* alternatively determines that the drive state of the driver is in which condition among the conditions A to H (see FIG. 4).

The approved target setting block 63*c* individually sets the approved operation target or the disapproved operation target to each of the plurality of operation targets so as to correspond to one of the conditions A to H (see FIG. 4) of the driving attitude determined by the attitude determination block 63*b*. With the processing, the plurality of operation targets are assigned as the operation target in which the override is approved or the operation target in which the override is not approved based on the driver's attitude.

The drive state switch block 63*a* switches the drive mode among the manual driving mode, an advanced driving support mode, and the coordination driving mode. The drive state switch block 63*a* switches the drive mode from the manual driving mode to the advanced driving support mode in response to an input to a switch for instructing the operation of ACC or LTC provided in the operation system such as a steering switch (see FIG. 11). In the advanced driving support mode, at least one of the ACC function block 161*b* and the LTC function block 161*c* functions.

When the vehicle is in the advanced driving support mode and it is determined that the advanced driving support system cannot continue the driving support, the configuration can switch the advanced driving support mode to the manual driving mode without executing the drive mode switch request.

In the advanced driving support mode, the approved operation target or the disapproved operation target is set to the plurality of operation targets based on the driving attitude of the driver. The driving operation input to the disapproved operation target is not approved as the override. Thus, even when the driving operation is input to the disapproved operation target, the advanced driving support mode is continued (see S124, S134, S154 and the like in FIG. 9).

For example, when the driving operation is input to the brake pedal 15 set as the approved operation target, the advanced driving support mode is canceled by the brake operation as the trigger. With the stop of the advanced driving support function, the drive mode of the vehicle A is switched from the advanced driving support mode to the manual driving mode (see S113 and the like in FIG. 5). When a steering amount of the steering operation which exceeds the steering threshold value is input to the steering wheel 16 set as the approved operation target, the drive mode is switched from the advanced driving support mode to the manual driving mode.

Figure 5:
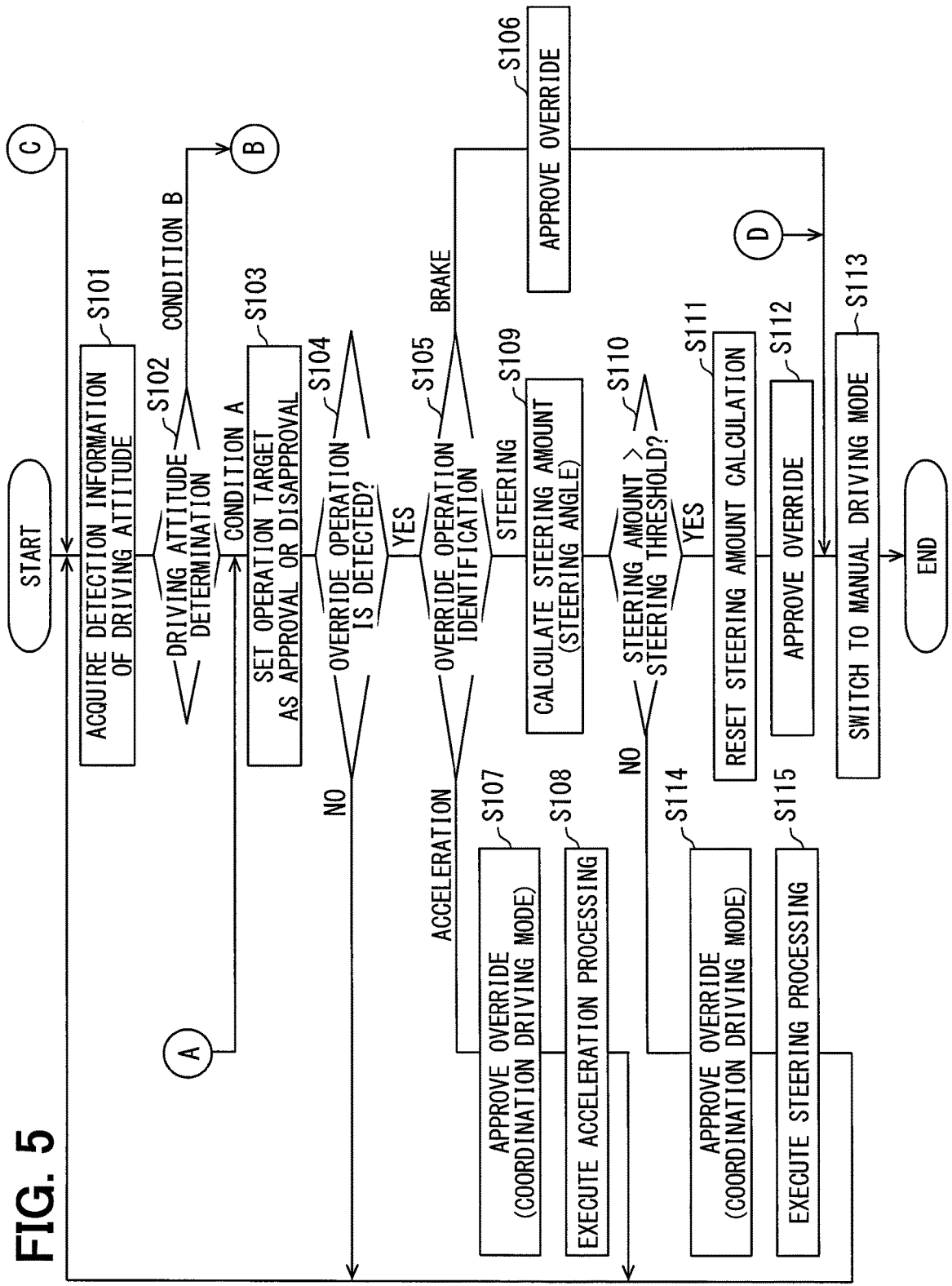
FIG. 5 is a flowchart showing an override control processing in which a condition A shown in FIG. 4 is selected.

When a steering amount of the steering operation which is equal to or less than the steering threshold value is input to the steering wheel 16 set as the approved operation target, the override operation is approved and the operation of the advanced driving support function is continued (see S114 and the like in FIG. 5). Similarly, when the driving operation is input to the accelerator pedal 14 set as the approved operation target, the advanced driving support does not stop and the override operation is approved (S107 and the like in FIG. 5). In these cases, the drive mode of the vehicle A is switched from the advanced driving support mode to the coordination driving mode.

In the coordination driving mode, when the brake operation or the steering operation of the steering amount exceeding the steering threshold value is further input, the drive mode is switched from the coordination driving mode to the manual driving mode. When the transition condition to the advanced driving support mode is satisfied without the detection of the driving operation to the approved operation target after the switch to the coordination driving mode, the drive mode is switched from the coordination driving mode to the advanced driving support mode. Similarly to the first embodiment, it is determined that the transition condition to the advanced driving support mode is satisfied, when a predetermined restart standby period (for example, approximately 3 seconds) has elapsed.

The similar effect to the first embodiment can be obtained in the transition of the right of the advanced driving support system as in the second embodiment described above. Thus, the configuration can suppress the occurrence of the unintended override, and cause the driver to appropriately perform the drive mode switch. In the second embodiment, the advanced driving support mode corresponds to the "autonomous driving state", the drive information acquisition unit 180*a* corresponds to the "operation information acquisition unit", and the vehicle control ECU 180 corresponds to the "drive mode switch control device".

Other Embodiments

While the embodiments of the present disclosure have been described above, the present disclosure is not limited to the embodiments, and the present disclosure may be applied to various embodiments or various combinations of the embodiments without departing from the subject of the present disclosure.

In the above embodiments, the accelerator pedal 14, the brake pedal 15, and the steering wheel 16 are exemplified as the plurality of operation targets. The operation targets to which the acceleration operation, the braking operation, and the steering operation are input are not limited to the above-described configurations. For example, an operation system may be defined so that the approved operation target or the disapproved operation target is set to the operation target such as a lever installed instead of the pedal and the steering wheel based on the each detection information item.

In the above embodiments, when both the pressure distribution on the seat surface and the position of the right foot are appropriate, it is determined that the seating state is appropriate for the operation of stepping on the brake pedal. When the seating state is appropriate, it is estimated that each pedal can be operated. When each pedal can be operated, it is estimated that the seating state is appropriate. Therefore, when one of the pressure distribution on the seat surface and the position of the right foot are appropriate, it may be determined that the seating state is appropriate for driving operation. When one of the pressure distribution on the seat surface and the position of the right foot is acquired as the detection information item indicating the seating state, the suitability of the seating state may be determined based on the one of the detection information item. A seat belt sensor which detects wearing of a seat belt may be used instead of the seat pressure distribution sensor 39 and the seat surface sensor as a sensor which acquires the detection information item related to the seating state.

In the above embodiments, when both the visual line direction and the face direction are appropriate, it is determined that the driving attitude is appropriate for approving the steering operation. When one of the visual line direction and the face direction is appropriate, the driving attitude may be determined that the steering operation is appropriate for the acceptance. In such a configuration, the information item extracted from the image data of the face camera may be one of the visual line direction and the face direction.

In the above embodiments, the update period of the plurality of determination results indicating the suitability of the driving attitude is set to be approximately the same as or shorter than the repetition period of the override control processing. The update period of the specific determination result may be set longer than the repetition period of the override control processing. In this case, in the override control processing, the approved operation target or the disapproved operation target is set with reference to the latest determination result. In addition, the update period of each determination result and the repetition period of the override control processing may be appropriately changed.

In the above embodiments, when the steering override is approved, the drive mode is switched to any one of the manual driving mode and the coordination driving mode. The steering amount, the steering torque, the steering continuation time, or the like is used as operation value for the determination of the switch to the manual driving mode or the coordination driving mode. The parameter used for the operation value may be appropriately changed. For example, an angular velocity of steering in the steering operation may be used as the operation value. In such a configuration, the switching to the manual driving mode is performed when a fast steering operation is input, and the switching to the coordination driving mode is performed when a slow steering operation is input.

In the above embodiments, when the accelerator override or the steering override with a small amount of the operation is performed, the switching to the coordination driving mode is executed without stopping the autonomous driving function. The coordination driving mode may not be set. In this case, when the override operation is approved, the autonomous driving function may immediately stop.

In the above embodiments, the suitability of the seating state, the visual line direction and the face direction, and the gripping state is determined based on the plurality of detection information items. In other words, the autonomous driving ECU acquires the detection information items necessary for determining the suitability of the seating state, the visual line direction and the face direction, or the gripping state from the sensors mounted on the vehicle. The plurality of detection information items related to such a driving attitude and each state of the driving attitude of which the suitability is determined based on each detection information item may be appropriately changed. In addition, the set method of the approved operation target and the disapproved operation target based on each state of the driving attitude can be appropriately changed.

In the above embodiments, when the driving operation is input to the disapproved operation target, the notification device may notify the driver that the driving operation cannot be approved by display or voice. With this information presentation, the drive mode switch control device can guide the driver to the appropriate state of the driving attitude. Moreover, the notification device which notifies the disapproval is not limited to the display device and the speaker device. The notification device may be constituted by a tactile sense presentation device.

The function of the drive mode switch control device may be realized by a configuration different from the configuration of the above-described autonomous driving ECU 50 and the vehicle control ECU 180. For example, a processing unit provided in the HCU 20 or the like may execute the drive mode switch control method according to the present disclosure. Alternatively, the processing unit, in which the functions of more than two of the autonomous driving ECU, the vehicle control ECU, and the HCU are integrated, may execute the drive mode switch control program according to the present disclosure. In the autonomous driving system, in which the Function of the HCU is integrated in the autonomous driving ECU, the detection information item of the DSM, the seat pressure distribution sensor, or the like may be directly input to the autonomous driving ECU.

Alternatively, a plurality of electronic control units may cooperate to execute the drive mode switch control method according to the present disclosure. As described above, each function related to drive mode switch may be appropriately realized by various electronic control units mounted on the vehicle. Various non-transitory tangible memory medium (non-transitory tangible storage medium) such as a flash memory and a hard disk may store the drive mode switch program or the like which is executed by each processing unit.

Although the present disclosure has been described in accordance with the examples, it is understood that the disclosure is not limited to such examples or structures. The present disclosure covers various modification examples and equivalent arrangements. In addition, while the various elements are shown in various combinations and configurations, which are exemplary, other combinations and configurations, including more, less or only a single element, are also within the spirit and scope of the present disclosure.

The flowcharts or the processing depicted in the flowcharts according to the present disclosure include a plurality of sections (alternatively referred to as steps) each indicated as S101 or the like. Some of the sections may be further divided into a plurality of subsections or may be appropriately combined to configure a single section. Each of these sections may also be referred to as a circuit, a device, a module, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. The hardware section may still alternatively be installed in a microcomputer.

The invention claimed is:

1. A drive mode switch control device for a vehicle configured to control switching of driving between a driver and an autonomous driving function, the vehicle including the autonomous driving function configured to replace a driving operation with the driver,
the drive mode switch control device comprising:
an operation information acquisition unit configured to acquire an operation information item associated with the driving operation input to at least one of a plurality of operation targets, the plurality of operation targets including at least an accelerator part, a brake part, and a steering part;
a drive state switch unit configured to execute an override that switches from an autonomous driving state, in which the autonomous driving function controls a travel of the vehicle, to another driving state, in which the driving operation of the driver reflects on a behavior of the vehicle, in response to an input of the driving operation to at least one of the plurality of operation targets while the vehicle is in the autonomous driving state;
an attitude determination unit configured to acquire a plurality of detection information items related to driving attitudes of the driver, and determine whether each of the plurality of detection information items is appropriate for the driving operation; and
an approved target setting unit configured to set an approved operation target, for which the override is approved, or a disapproved operation target, for which the override is not approved, to each of the accelerator part, the brake part, and the steering part included in the plurality of operation targets based on whether each of the plurality of detection information items is appropriate for the driving operation,
wherein:
the attitude determination unit acquires information indicating a seating state of the driver as one of the plurality of detection information items and determines whether the seating state is appropriate for the driving operation;
the approved target setting unit sets the brake part as the approved operation target when the attitude determination unit determines that the seating state is appropriate for the driving operation; and
the approved target setting unit sets the brake part as the approved operation target when the attitude determination unit determines that the seating state is appropriate for the driving operation even in a case where the plurality of detection information items other than the seating state are inappropriate for the driving operation.

2. The drive mode switch control device according to claim 1, wherein
the drive state switch unit, in response to the input of the driving operation to the brake part set as the approved operation target, stops the autonomous driving function and switches to a manual driving state, in which the travel of the vehicle is controlled by the driver.

3. The drive mode switch control device according to claim 1, wherein
the attitude determination unit acquires information indicating one of a visual line direction and a face direction of the driver as one of the plurality of detection information items, and determines whether the one of the visual line direction and the face direction is appropriate for the driving operation; and
the approved target setting unit sets the accelerator part as the disapproved operation target when the attitude determination unit determines that the one of the visual line direction and the face direction is inappropriate for the driving operation.

4. The drive mode switch control device according to claim 3, wherein
the approved target setting unit sets the accelerator part as the disapproved operation target when the attitude determination unit determines that the one of the visual line direction and the face direction is inappropriate for the driving operation even in a case where the plurality of detection information items other than the one of the visual line direction and the face direction are appropriate for the driving operation.

5. The drive mode switch control device according to claim 3, wherein:
the approved target setting unit sets the accelerator part as the approved operation target when the attitude determination unit determines that the one of the visual line direction and the face direction is appropriate for the driving operation; and
the drive state switch unit switches from the autonomous driving state to a coordination driving state, in which the travel of the vehicle is controlled by coordinating a control of the autonomous driving function and the driving operation of the driver, in response to the input of the driving operation to the accelerator part set as the approved operation target.

6. The drive mode switch control device according to claim 1, wherein
the attitude determination unit acquires information indicating a gripping state of the steering part as one of the plurality of detection information items, and determines whether the gripping state of the steering part is appropriate for the driving operation; and
the approved target setting unit sets the steering part as the disapproved operation target when the attitude determination unit determines that the gripping state of the steering part is inappropriate for the driving operation.

7. The drive mode switch control device according to claim 6, wherein
the approved target setting unit sets the steering part as the disapproved operation target when the attitude determination unit determines that the gripping state of the steering part is inappropriate for the driving operation even in a case where the plurality of detection information items other than the gripping state of the steering part are appropriate for the driving operation.

8. The drive mode switch control device according to claim 6, wherein:

the approved target setting unit sets the steering part as the approved operation target when the attitude determination unit determines that the gripping state of the steering part is appropriate for the driving operation; and the drive state switch unit switches to a coordination driving state, in which the travel of the vehicle is controlled by coordinating a control of the autonomous driving function and the driving operation of the driver, when an operation value related to the driving operation input to the steering part set as the approved operation target is smaller than a steering threshold value corresponding to the operation value.

9. The drive mode switch control device according to claim 8, wherein:

the drive state switch unit stops the autonomous driving function and switches to a manual driving state, in which the travel of the vehicle is controlled by the driver, when the operation value is greater than the steering threshold value.

10. A method for a vehicle, the vehicle including an autonomous driving function configured to replace a driving operation with the driver, the method being executed by at least one processing unit, the method comprising:

acquiring a plurality of detection information items related to driving attitudes of the driver while the vehicle is in an autonomous driving state, in which the autonomous driving function controls a travel of the vehicle;

determining whether each of the plurality of detection information items is appropriate for the driving operation;

setting an approved operation target, for which an override is approved, or a disapproved operation target, for which the override is not approved, to at least an accelerator part, a brake part, and a steering part included in a plurality of operation targets based on whether each of the plurality of detection information items is appropriate for the driving operation;

acquiring an operation information item associated with the driving operation input to at least one of the plurality of operation targets;

switching from the autonomous driving state to another driving state, in which the driving operation of the driver reflecting on a behavior of the vehicle, by approving the driving operation to the approved operation target as the override;

disapproving the driving operation to the disapproved operation target as the override;

acquiring information indicating a seating state of the driver as one of the plurality of detection information items;

determining whether the seating state is appropriate for the driving operation;

setting the brake part as the approved operation target in response to determining that the seating state is appropriate for the driving operation; and setting the brake part as the approved operation target in response to determining that the seating state is appropriate for the driving operation even in a case where the plurality of detection information items other than the seating state are inappropriate for the driving operation.

11. A drive mode switch control device for a vehicle, the vehicle including an autonomous driving mode configured to replace a driving operation with a driver, the drive mode switch control device comprising a processor configured to:

control switching of driving between the driver and the autonomous driving mode;

acquire an operation information item associated with the driving operation input to at least one of a plurality of operation targets, the plurality of operation targets including at least an accelerator part, a brake part, and a steering part;

execute an override that switches from an autonomous driving state, in which the vehicle operating in the autonomous driving mode controls a travel of the vehicle, to another driving state, in which the driving operation of the driver reflects on a behavior of the vehicle, in response to an input of the driving operation to at least one of the plurality of operation targets while the vehicle is in the autonomous driving mode;

acquire a plurality of detection information items related to driving attitudes of the driver, and determine whether each of the plurality of detection information items is appropriate for the driving operation;

set an approved operation target, for which the override is approved, or a disapproved operation target, for which the override is not approved, to each of the accelerator part, the brake part, and the steering part included in the plurality of operation targets based on whether each of the plurality of detection information items is appropriate for the driving operation;

acquire information indicating a seating state of the driver as one of the plurality of detection information items and determine whether the seating state is appropriate for the driving operation;

set the brake part as the approved operation target in response to determining that the seating state is appropriate for the driving operation; and set the brake part as the approved operation target in response to determining that the seating state is appropriate for the driving operation even in a case where the plurality of detection information items other than the seating state are inappropriate for the driving operation.

* * * * *